United States Patent [19]
Klein et al.

[11] Patent Number: 6,134,665
[45] Date of Patent: Oct. 17, 2000

[54] COMPUTER WITH REMOTE WAKE UP AND TRANSMISSION OF A STATUS PACKET WHEN THE COMPUTER FAILS A SELF TEST

[75] Inventors: Philippe Klein, Jerusalem; Simoni Ben-Michael, Givat Zeev; Avraham Menachem, Jerusalem; Sarit Shvimmer, Bait-Shemesh, all of Israel

[73] Assignee: Digital Equipment Corporation, Maynard, Mass.

[21] Appl. No.: 09/009,809

[22] Filed: Jan. 20, 1998

[51] Int. Cl.[7] .................................................. E06F 1/26
[52] U.S. Cl. .......................................... 713/300; 709/200
[58] Field of Search ...................... 714/15; 713/300–340; 709/200

[56] References Cited

U.S. PATENT DOCUMENTS

| | | | |
|---|---|---|---|
| 4,233,500 | 11/1980 | Cordill | 235/310 |
| 4,691,202 | 9/1987 | Denne et al. | 340/825.54 |
| 5,059,836 | 10/1991 | Lee et al. | 307/520 |
| 5,267,172 | 11/1993 | Vermesse | 364/464.02 |
| 5,404,544 | 4/1995 | Crayford | 395/750 |
| 5,553,081 | 9/1996 | Downey et al. | 371/6 |
| 5,640,157 | 6/1997 | Langeraar | 340/984 |
| 5,726,541 | 3/1998 | Glenn et al. | 318/16 |
| 5,802,305 | 9/1998 | McKaughn et al. | 395/200.57 |
| 5,826,018 | 10/1998 | Vixie et al. | 395/200.6 |
| 5,964,879 | 10/1999 | Dunstan et al. | 713/340 |
| 6,032,048 | 2/2000 | Hartless et al. | 455/506 |
| 6,032,271 | 2/2000 | Goodrum et al. | 714/56 |
| 6,032,272 | 2/2000 | Soirinsuo et al. | 714/706 |
| 6,032,281 | 2/2000 | Fujisaki | 714/738 |

OTHER PUBLICATIONS

Danbury and Goff, Small Area Networks using Serial Data Transfer—I2C Bus with Multiple Masters, Electronic Engineering, Apr. 1994, pp. 85–95.

I2C Bus and How To Use It, Philip Semiconductor, Apr. 1995, pp. 1–24.

PCF 84C00, 8–Bit Microcontrolled with I2C interface, Philip Semiconductors Integrated Circuits, Nov. 1996, pp. 2–23.

Primary Examiner—Ayaz R. Sheikh
Assistant Examiner—David Wiley
Attorney, Agent, or Firm—Cesari and McKenna, LLP

[57] ABSTRACT

An apparatus for use in a computer has a network interface subsystem having power applied thereto when power is removed from other components of the computer. A receiver in the network interface subsystem receives a packet directed to the computer from the network, and in response to receipt of a selected packet, restores power to the other components of the computer. Upon restoration of power to the other components of the computer, a signalling device reports status of at least one of the other components of the computer to the network interface subsystem. A transmitter in the network interface subsystem sends, in response to the signalling device, a status packet onto the network giving a status of the computer in the event that a component is not functional, following restoration of power to the other components of the computer. The computer has a processor which executes a self test upon restoration of power to the processor, and a self test signalling device to signal to the network interface subsystem the results of the self test, to initiate transmission of a status packet by the network interface onto the network in the event that the computer fails the self test. The signalling device may be a management bus, and the management bus may operate under the I2C protocol. The receiver uses imperfect filtering to identify a wake up packet, and also may use a mask in performing imperfect filtering.

11 Claims, 31 Drawing Sheets

1/G = 0 INDIVIDUAL ADDRESS
1/G = 1 GROUP ADDRESS
U/L = 0 GLOBALLY ADMINISTERED ADDRESS
U/L = 1 LOCALLY ADMINISTERED ADDRESS

UNICAST IP

| OFFSET (BYTES) | | PATTERN (HEX) | |
|---|---|---|---|
| ETHERNET | 802.3 | | |
| 00 | 00 | XX XX XX XX XX XX | DESTINATION MAC ADDRESS (STATION ADDRESS) |
| 12 | 20 | 08 00 | PROTOCOL TYPE (IP) |

FIG. 8

ARP REQUEST (IPV4 ONLY)

| OFFSET (BYTES) | | PATTERN (HEX) | |
|---|---|---|---|
| ETHERNET | 802.3 | | |
| 00 | 00 | FF FF FF FF FF FF | DESTINATION MAC ADDRESS (BROADCAST) |
| 12 | 20 | 08 06 | PROTOCOL TYPE (ARP) |
| 21 | 29 | 01 | ARP OPCODE (REQUEST) |
| 38 | 46 | XX XX XX XX | IP ADDRESS REQUESTED |

FIG. 9

NBT NAME QUERY/REGISTRATION FOR COMPUTERNAME (IPV4 ONLY)

| OFFSET (BYTES) | | PATTERN (HEX) | |
|---|---|---|---|
| ETHERNET | 802.3 | | |
| 00 | 00 | FF FF FF FF FF FF | DESTINATION MAC ADDRESS (BROADCAST) |
| 12 | 20 | 08 00 | PROTOCOL TYPE (IP) |
| 23 | 31 | 11 | PROTOCOL (UDP) |
| 34 | 42 | 00 89 00 89 | PORT NUMBER (NETBIOS NAME SERVICE) |
| 45 | 53 | 10 | NETBIOS FLAGS (QUERY OR REGISTRATION) |
| 54 | 62 | 20 | NULL SCOPE BYTE LEADING THE COMPUTERNAME FIELD |
| 55 | 63 | xx xx xx xx xx xx xx xx<br>xx xx xx xx xx xx xx xx<br>xx xx xx xx xx xx xx xx<br>xx xx xx xx xx xx xx xx | COMPUTERNAME: 32_BUTES FIELD CODING IN HALF ASCII THE NAME OF THE COMPUTER. |

FIG. 10

NEIGHBOR SOLICITATION (IPV6 ONLY)

| OFFSET (BYTES) | | PATTERN (HEX) | |
|---|---|---|---|
| ETHERNET | 802.2/3 | | |
| 00 | 00 | FF FF FF FF FF FF | DESTINATION MAC ADDRESS (BROADCAST) |
| 12 | 20 | 08 00 | PROTOCOL TYPE (IP) |
| 38 | 46 | xx xx xx xx xx xx xx xx<br>xx xx xx xx xx xx xx xx | IP DESTINATION ADDRESS (TARGET'S SOLICITED-NODE MULTICAST ADDRESS) |

FIG. 11

UNICAST IPX

| FRAME TYPE | OFFSET (BYTES) | PATTERN (HEX) | |
|---|---|---|---|
| ALL | 00 | XX XX XX XX XX XX | DESTINATION MAC ADDRESS (STATION ADDRESS) |
| ETH_11 | 12 | 81 37 | PROTOCOL TYPE (IPX) |
| ETH_SNAP | 14 | AA AA 03 00 00 00 81 37 | SAP + PROTOCOL TYPE (IPX) |
| ETH_802.3 | 14 | FF FF | PROTOCOL TYPE (IPX) |
| ETH_802.2 | 14 | E0 E0 03 | SAP + CONTROL (IPX) |

FIG. 12

IPX DIAGNOSTIC RESPONDER REQUEST

| FRAME TYPE | OFFSET (BYTES) | PATTERN (HEX) | |
|---|---|---|---|
| 1301 ALL | 00 | FF FF FF FF FF FF | DESTINATION MAC ADDRESS (BROADCAST) |
| 1302 ETH_II | 12 | 81 37 | PROTOCOL TYPE (IPX) |
|  | 30 | 04 56 | IPX DESTINATION SOCKET (DIAGNOSTIC REQUEST) |
| 1304 ETH_SNAP | 14 | AA AA 03 00 00 00 B1 37 | SAP + PROTOCOL TYPE (IPX) |
|  | 38 | 04 56 | IPX DESTINATION SOCKET (DIAGNOSTIC REQUEST) |
| 1306 ETH_802.3 | 14 | FF FF | PROTOCOL TYPE (IPX) |
|  | 30 | 04 56 | IPX DESTINATION SOCKET (DIAGNOSTIC REQUEST) |
| 1308 ETH_802.2 | 14 | E0 E0 03 | SAP + PROTOCOL TYPE (IPX) |
|  | 33 | 04 56 | IPX DESTINATION SOCKET (DIAGNOSTIC REQUEST) |

FIG. 13

PATTERN FILTER REGISTER FORMAT

| 31 | 24 | 15 | 7 | 0 | |
|---|---|---|---|---|---|
| BYTE MASK #1 ||||| R0 |
| BYTE MASK #2 ||||| R1 |
| BYTE MASK #3 ||||| R2 |
| BYTE MASK #4 ||||| R3 |
| COMMAND #1 | COMMAND #2 | COMMAND #3 || COMMAND #4 | R4 |
| OFFSET #1 | OFFSET #2 | OFFSET #3 || OFFSET #4 | R5 |
| CRC 16 # 1 ||| CRC 16 # 2 || R6 |
| CRC 16 # 3 ||| CRC 16 # 4 || R7 |

FIG. 14

4.4.2 PATTERN COMMAND

| BIT | DEFAULT VALUE | ACCESS | | |
|---|---|---|---|---|
| 07:04 | 0h | R/W | RESERVED | |
| 03 | 0h | R/W | AND_PREVIOUS | WHEN SET, ANDS THE CURRENT ENTRY MATCHING SIGNAL WITH THE MATCHING SIGNAL OF THE PREVIOUS FILTER'S ENTRY.<br><br>THIS ALLOWS TO FILTER A PATTERN LONGER THAN THE ENTRY'S BYTE MASK (32 BYTES) BY SPLITTING IT ALONG MULTIPLE FILTER'S ENTRIES.<br><br>FOR FILTER # 1, AND_PREVIOUS CHAINS THE FILTER'S MATCHING SIGNAL WITH THE RESULT OF THE GLOBAL_UNICAST FILTER. |
| 02 | 0h | R/W | ADDRESS_TYPE | INDICATES THE DESTINATION ADDRESS TYPE (UNICAST OR BROADCAST) OF THE PATTERN.<br>0: BROADCAST<br>1: UNICAST<br><br>THE PATTERN DESTINATION ADDRESS I NOT FILTERED BY THE PATTERN FILTER BUT BY THE ADAPTER'S CAM. A MISMATCH BETWEEN THE ADDRESS_TYPE BIT AND THE ADDRESS_TYPE SIGNAL PROVIDED BY THE CAM INVALIDATES THE PATTERN CRC MATCHING. |
| 01 | 0h | R/W | INVERSE MODE | WHEN SET, INVERSE THE LOGIC OF THE CRC MATCHING SIGNAL TO MAKE THE PATTERN A REJECTION PATTERN.<br><br>TOGETHER WITH THE AND_PREVIOUS MODE, ALLOWS TO REJECT A SUBSET OF WAKE UP PACKETS (BY CREATING FILTER LIKE "PATTERN 1 AND NOT PATTERN 2"). |
| 00 | 0h | R/W | ENABLE FILTER | WHEN SET, ENABLE THE PATTERN FILTERING. |

FIG. 15

4.4.1 PATTERN'S BYTE MASK

| BIT | DEFALUT VALUE | ACCESS | | |
|---|---|---|---|---|
| 31:00 | 0h | R/W | PATTERN'S BYTE MASK | IF BIT NUMBER / OF THE BYTE MASK IS 1, THEN BYTE NUMBER (/+OFFSET) OF THE INCOMING FRAMES WILL BE STROBE BY THE PATTERN'S CRC MACHINE. OTHERWISE BYTE / IS IGNORED. |

FIG. 16

4.4.3 PATTERN'S OFFSET

| BIT | DEFALUT VALUE | ACCESS | | |
|---|---|---|---|---|
| 07:00 | 00 h | R/W | PATTERN'S OFFSET | THE OFFSET OF THE FIRST BYTE OF THE PATTERN FIELD WITHIN THE FRAME (OFFSET 0 IS THE FIRST BYTE OF THE FRAME'S DESTINATION ADDRESS). |

FIG. 17

4.4.4 PATTERN'S CRC

| BIT | DEFALUT VALUE | ACCESS | | |
|---|---|---|---|---|
| 15:00 | 0000 h | R/W | PATTERN'S CRC | THE 16_BIT CRC MATCHING VALUE CALCULATED FROM THE PATTERN AND BYTE_MASK GIVEN BY THE TRANSPORT. |

FIG. 18

SEND BYTE PROTOCOL

SEND BYTE PROTOCOL:

THE SEND BYTE PROTOCOL DECODES AS FOLLOWS
(RECEIVED LEFT TO RIGHT):
START CONDITION, 7 BITS OF ADDRESS, 1 BIT WR,
ACK, 1 BYTE COMMAND, ACK, STOP CONDITION.

1. START_DELIMITER:

START_DELIMITER SHOULD BE SEND EACH TIME A NEW PACKET IS TRANSFERRED OVER THE I²C BUS.

COMMAND CODE: 0000CP01 (BINARY)

- C: ADD CRC
  WHEN THIS BIT IS SET, THE 2114X WILL CALCULATE AND APPEND THE CRC TO THE TRANSMITTED PACKET.

- P: DISABLE PADDING
  WHEN THIS BIT IS SET, THE 2114X WILL NOT ADD PADDING TO THE PACKET. WHEN THIS BIT IS RESET TO ZERO, THE 2114X WILL APPEND ZERO BYTES TO PACKETS SHORTER THAN 64 BYTES. PACKETS THAT WILL BE PADDED WILL ALSO HAVE CRC CALCULATED AND APPENDED REGARDLESS OF THE ADD CRC BIT.

| C | P |  |
|---|---|---|
| 1 | 0 | PADDING AND CRC ARE ADDED BY THE 2114X |
| 1 | 1 | CRC ONLY ADDED BY THE 2114X |
| 0 | 1 | NO PADDING AND NO CRC ADDED BY THE 2114X |
| 0 | 0 | INVALID |

FIG. 40

COMPUTER WITH REMOTE WAKE UP AND TRANSMISSION OF A STATUS PACKET WHEN THE COMPUTER FAILS A SELF TEST

FIELD OF THE INVENTION

This invention relates to use of a computer having a low power or "sleeping state" and the computer connected to a network, and more particularly to waking the computer upon receipt of a packet from the network, and sending a message on the network in the event that the computer is non-functional.

BACKGROUND

For energy saving reasons, it is often convenient, when a computer is not in use, that it is either: powered down; or placed in a very low power consumption state. For some applications, entirely powering down a computer is not acceptable. For example, a computer connected to a network cannot be managed from a remote site if the computer is entirely powered down.

One alternative is to have a subsystem of the computer maintained at full power for the reception of packets from the network, so that another computer on the network may issue a special "wake-up" packet, the reception of which causes the computer to become powered up.

Upon awakening, a computer which was asleep may not be in working condition as a result of a fault. Accordingly, it is desirable to test the computer in order to determine if the computer is in working condition. However, there is no way for a remote computer which is not functional to transmit a message on a network, so that a remote management computer learns the status of the broken computer.

There is needed, in the event of a failure of a component of a computer upon the awakening of the computer from a "sleep" state, a means for the computer to transmit information onto the network to another computer, so that notice of the failure is brought to the attention of the proper authorities. The proper authorities may be either a person, a management software application, or some other entity monitoring operation of computers connected to the network.

SUMMARY OF THE INVENTION

The failure of a component of a computer upon the awakening of the computer is brought to the attention of proper authorities by transmitting a status packet onto a network.

An apparatus for use in a computer has a network interface subsystem having power applied thereto when power is removed from other components of the computer. A receiver in the network interface subsystem receives a packet directed to the computer from the network, and in response to receipt of a selected packet, restores power to the other components of the computer. Upon restoration of power to the other components of the computer, a signaling device reports status of at least one of the other components of the computer to the network interface subsystem. A transmitter in the network interface subsystem sends, in response to the signaling device, a status packet onto the network giving a status of the computer in the event that a component is not functional, following restoration of power to the other components of the computer. The computer has a processor which executes a self test upon restoration of power to the processor, and a self test signaling device to signal to the network interface subsystem the results of the self test, to initiate transmission of a status packet by the network interface onto the network in the event that the computer fails the self test. The signaling device may be a management bus, and the management bus may operate under the I2C protocol. The receiver uses imperfect filtering to identify a wake up packet, and also may use a mask in performing imperfect filtering.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 8 is a packet format diagram for a unicast IP packet.

FIG. 9 is a packet format diagram for an ARP request packet.

FIG. 10 is a packet format diagram for a NBT name/query registration packet.

FIG. 11 is a packet format diagram for a neighbor solicitation packet.

FIG. 12 is a packet format diagram for a unicast IPX packet.

FIG. 13 is a packet format diagram for a IPX diagnostic responder request packet.

FIG. 14 is a register format diagram.

FIG. 15 is a chart of a register field for filter commands.

FIG. 16 is a chart of a register field for a byte mask.

FIG. 17 is a chart of a register field for an offset for a filter mask.

FIG. 18 is a chart of a register field for a filter hash function result.

FIG. 40 is a field diagram of a start delimiter

DETAILED DESCRIPTION

The network subsystem of a computer of the invention is fully powered up, even when power is withdrawn from other components of the computer. When the network subsystem detects a "wake up" packet, the network subsystem initiates restoration of power to the other components of the computer system. That is, the network subsystem signals a power management subsystem, and the power management subsystem restores power to the rest of the computer system. The wake up packets are selected from the management packets used in the network protocol. These selected ordinary protocol packets are referred to as "desired packets". The full computer system is then able to process the incoming desired packet, in the event that the "desired" packet is stored in memory, after the system is back up and running. Alternatively, the packet may wake up the computer but the packet be lost, in which event the system will be up and running and able to receive a retry packet from a retry request.

Having a desired packet initiate a wake-up cycle of the computer system allows the system to be "virtually connected", even when part of the system is powered down or is in a low power consumption state. Being "virtually connected" enables the system to be in a low power state, and at the same time monitor the network and act as if it were up and running. In other words, a networking protocol which requires responses to specific packets that are sent to the computer system will cause power to be restored to the computer system, that is the computer system will be awakened. The networking protocol will then not time out, and will not declare that the computer is a "dead system".

HARDWARE

Figure 1:
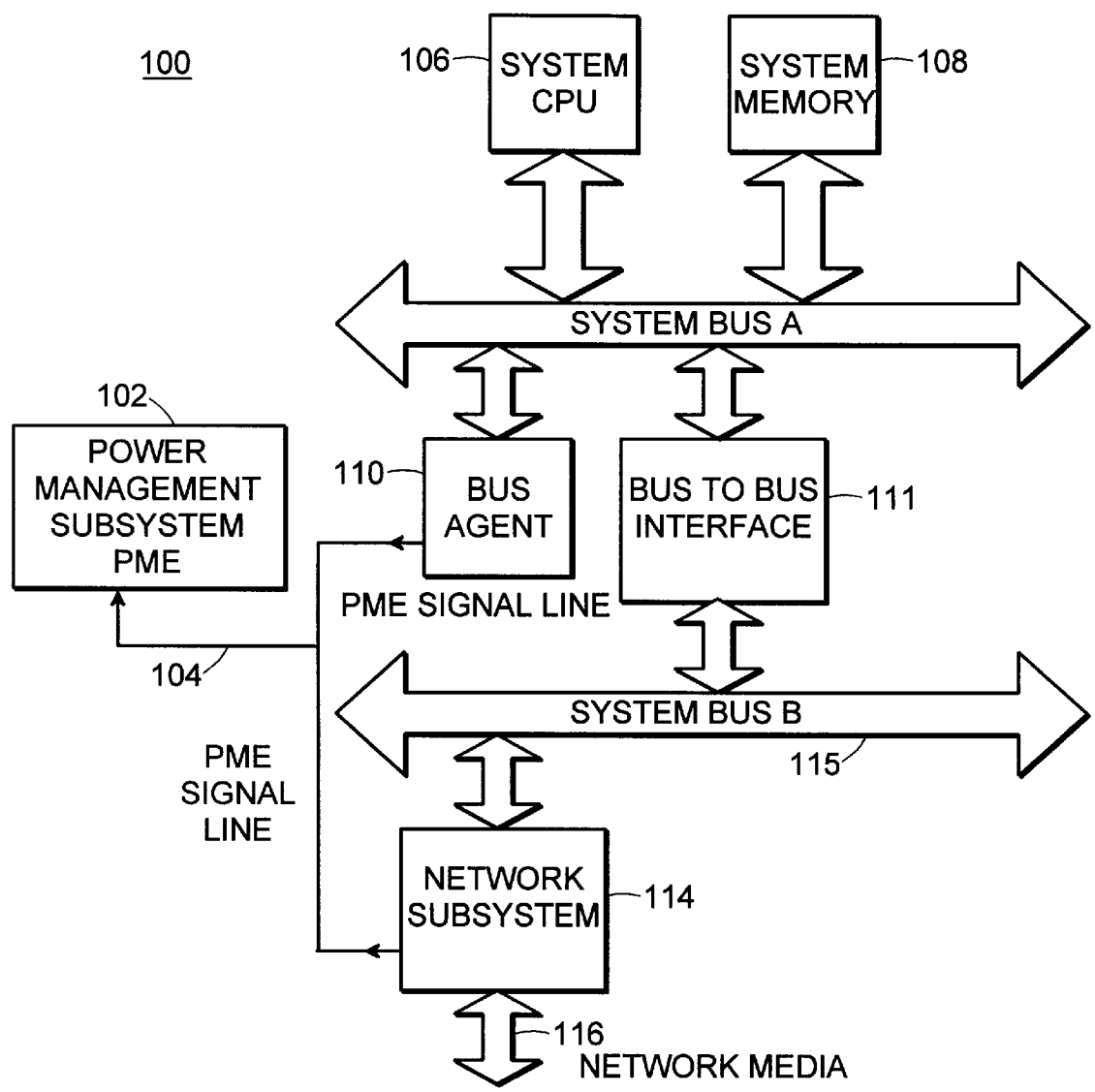
FIG. 1 is a block diagram of hardware of a computer system.

Turning now to FIG. 1, a computer system 100 has a power management subsystem 102. The power management subsystem 102 is connected by wake signal line 104 to various components of computer system 100. For example, components of computer system 100 connected to the power management subsystem 102 through wake signal line 104 include a bus agent 110 and a network subsystem 114.

In operation, when power management subsystem 102 receives an assertion of the wake signal line 104, then power management subsystem 102 executes a power management cycle. In a first exemplary embodiment of the invention, the power management cycle executed by the power management subsystem 102 is simply a boot cycle. In a boot cycle the power management subsystem simply re-initializes the computer, that is the power management subsystem brings the computer into full operation from whatever state the computer was in before receipt of the assertion of wake signal line 104.

In a second exemplary embodiment of the invention, the power management subsystem 102 determines which component of the computer asserted the wake signal line 104 and performs a power management cycle appropriate to the component which asserted the Wake signal line 104.

In the present invention, the computer is capable of operating in a low power mode. In a low power mode, the supply of power to selected system components is withdrawn, thereby causing the selected components to be inactive. Full power may be maintained to a "wake-up component", and upon the occurrence of an event, the wake-up component signals the power management subsystem 102 on the wake signal line 104, and causes the power management subsystem to execute a system boot. Upon execution of the system boot, all components of the computer are supplied with full power requirements, and the computer functions normally.

In a preferred embodiment of the invention, the network subsystem 114 is maintained at full power, and all other components of the computer such as the system CPU 106, system memory 108, bus agent 110, etc., have power withdrawn by power management subsystem 102. In this state the computer system 100 is said to be "asleep". Upon the detection of a selected type of packet on a network media 116, network subsystem 114 asserts wake signal line 104. Power management subsystem 102 detects assertion of wake signal line 104, and executes a boot cycle for computer 100.

Stated simply, detection of a selected type of packet on network media 116 by network subsystem 114 causes a sleeping computer to be booted, and for the sleeping computer to become fully functional.

In the exemplary embodiment of the invention shown in FIG. 1, computer system 100 has a moderately complex system architecture in that it has two system busses connected by a bus-to-bus interface 111. A simpler computer system could have only one system bus. Even more complex computer systems could have multiple system CPU units, multiple memory units, multiple memory caches, and a more complex bus architecture connecting the components. The computer system 100 is meant to be representative of computer systems having both simpler architectures and more complex architectures, as the important point emphasized in the computer system 100 is that network subsystem 114 detects a selected type of packet on network media 116, and in response to this detection of a packet, causes a sleeping computer system to become a fully booted and functional computer system. In short, the detection of a selected packet by the network subsystem causes a sleeping computer to awake, and become fully functional, no matter what the architecture of the computer is.

Figure 2:
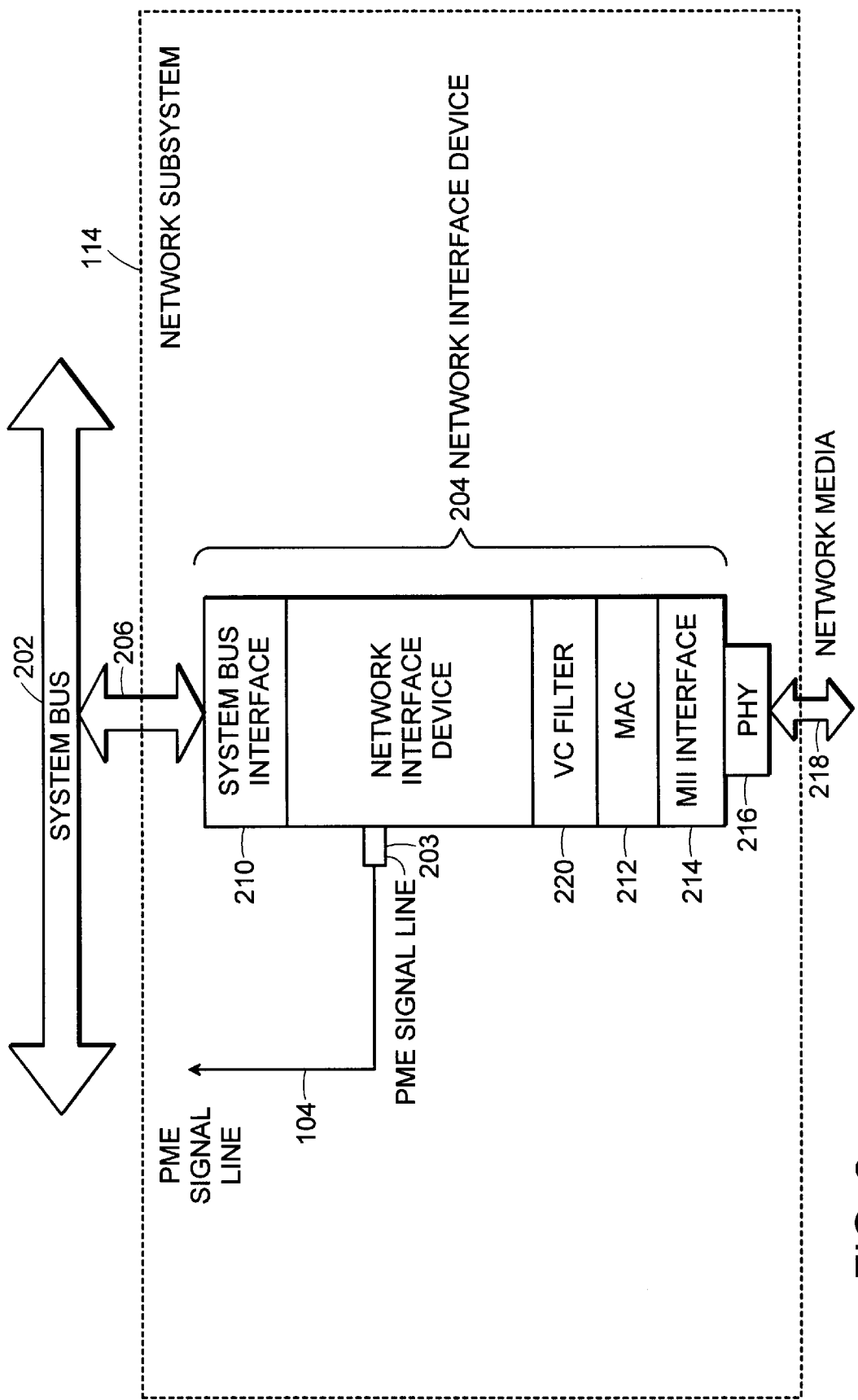
FIG. 2 is a block diagram of a network subsystem.

Turning now to FIG. 2, network subsystem 114 is shown along with system bus 202. Wake signal line 104 connects to wake signal pin 203 of a network interface device 204. Also, network interface device 204 connects, along bus path 206, to system bus 202. System bus 202 may be any convenient bus. For example, system bus 202 may be system bus B 115 of FIG. 1. Alternatively, system bus 202 may be a PCI bus, PCI/Card bus, EISA bus, or the older ISA bus, or any other convenient system bus. Also the system bus 202 may be coupled to a USB bus (Universal Serial Bus, a new protocol bus), IEEE 1394 Standard "FireWire" bus, or any other convenient bus for coupling components into a computer system.

For example, the USB, or Universal Serial Bus, is a standard backed by more than 100 companies led by Intel, Microsoft, Compaq, Digital Equipment Corporation, International Business Machine (IBM), Nippon Electric (NEC), etc. The USB bus is designed to solve many of the connection problems which desktop computers have, for example problems such as: too many different connections, printers, mice, joysticks, scanners, modems, speakers, removable drives, bar-code readers, telephones, etc.; and too many cables. The USB is a common designed to provide connection for devices such as these.

For example, the IEEE Standard 1394, which has similarities to the USB bus, but is specified for higher data rates such as 100, 200, and 400 megabits/second.

Network interface device 204 includes a system bus interface 210 for connection to system bus 202. Network interface device 204 also contains Media Access Controller, MAC, device 212. The MAC device 212 connects by Media Independent Interface, MII, 214 to physical device Phy 216. Physical device Phy 216 then connects to the media 218 of a computer network. The MAC device 212, MII interface 214, and physical device Phy 216, for example, may be the standard devices as defined in IEEE standard 802.3, including 802.3u. All disclosures of the IEEE standards 802.3 are incorporated herein by reference.

The network media 218 may be the media of an Ethernet network, and may be twisted pair, coaxial cable, optical fiber, or any other suitable network media. Further, network media 218 may be for any desired computer network, and the computer network may be: alternatively an Ethernet network; alternatively an ATM, or Asynchronous Transfer Mode, network; alternatively, an FDDI, or Fiber Distributed Data Interface, network; and, alternatively, the network may be a telephone line and the media 218 be a local loop telephone connection, a T1 telephone line, an OC3 optical fiber telephone line, or any other convenient computer network media. Although Microsoft currently only supports the Virtual Connection concept for IP and IPX protocols, the invention as described herein may be used for any convenient computer network or protocol.

Network interface device 204 also has virtual connect filter 220, hereinafter VC filter 220. VC filter 220 filters incoming packets after they have been detected by the MAC device 212 in order to determine whether or not computer system 114 should be awakened by network interface device 204 asserting wake signal pin 203, as more fully described hereinafter.

Figure 3:
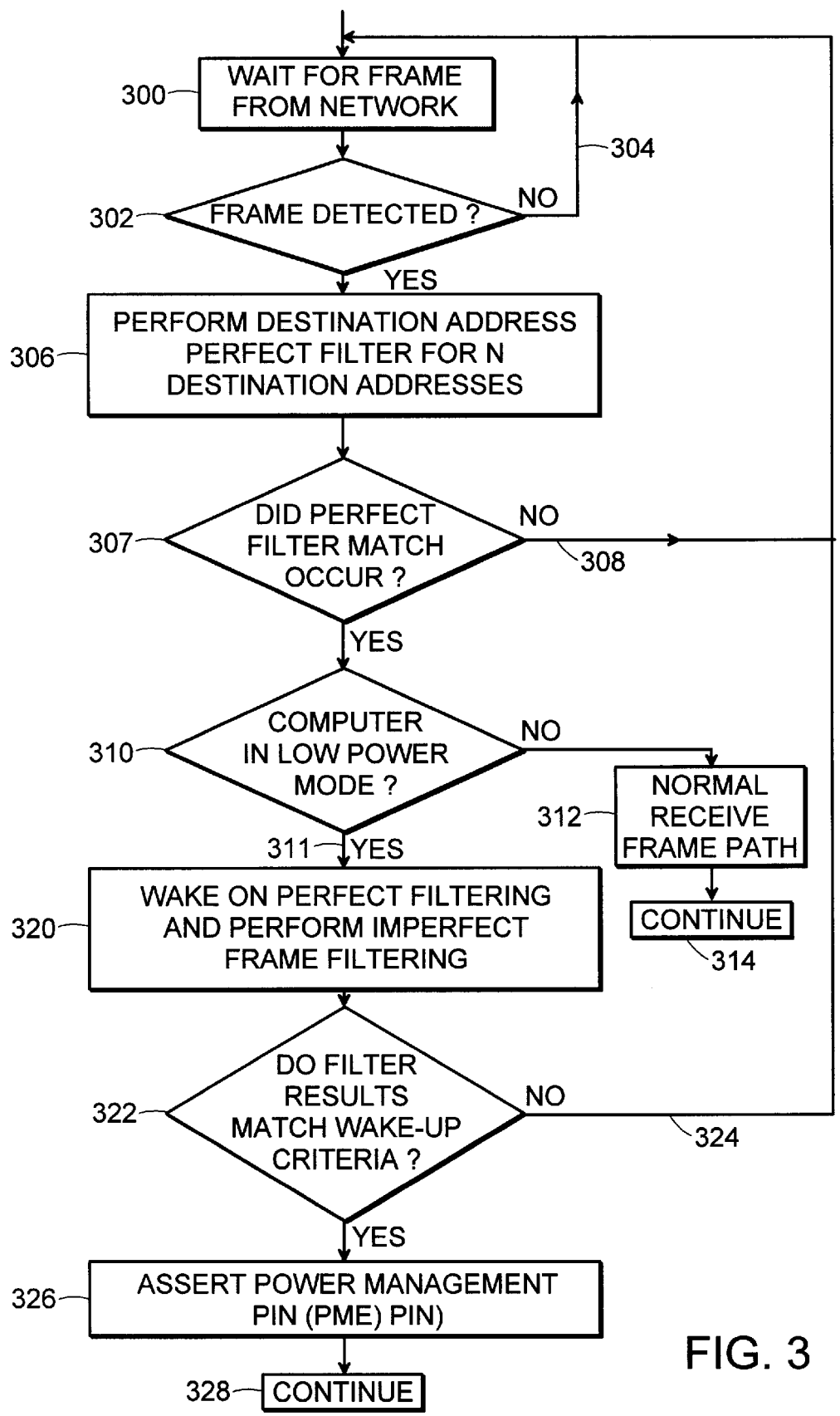
FIG. 3 is a flow chart of a filtering method.

Turning now to FIG. 3, there is shown a flow chart for a process which wakes up a sleeping computer. The process is executed by network interface device 204. At block 300 and decision block 302, along with return path 304, the system waits for detection of a packet from the network.

In the event that a packet is detected at decision block 302, the process goes to block 306. At block 306 a perfect filter operation is performed on the destination addresses of the packet. A number, represented by N, addresses are tested by perfect filtering. In a preferred embodiment of the invention, provision is made for testing up to eight (8) destination addresses by perfect filtering.

For example, two addresses may be tested by perfect filtering: first, the physical address of the computer; and, second a broadcast address, which is 48 "1" bits, or in hex FF FF FF FF FF FF.

At decision block 307, if a perfect filter match occurred, then the process goes to decision block 310. However, if at decision block 307 no perfect filter match occurred, then the process returns along path 308 to block 300 to wait for detection of another packet.

At decision block 310 the power mode of the computer is determined. If the computer is not in low power mode, the process goes to a normal receive frame path at block 312, and then continues at block 314. In the event that the computer is in the low power mode, the process goes along path 311 to block 320.

At block 320 the process computes imperfect filter functions for the packet. In a preferred embodiment of the invention, masks are used in imperfect filtering in order to select bytes from the packet. The selected bytes are then used in a selected number of hash function calculations. The results of the hash function calculations are then compared with desired hash functions, and in the event that the computed hash function matches a desired hash function, the computer is awakened. Upon completion of the imperfect filtering calculations, the process proceeds to decision block 322.

At decision block 322 the results of the computation of the filter functions is compared with the "wake-up criteria". In the event that block 322 determines that the "wake-up criteria" are not met, the process returns along path 324 to wait for detection of another packet at blocks 300 and decision block 302. In the event that block 322 determines that the "wake-up criteria" are met, the process goes to block 326.

At block 326 the process wakes-up the computer. Wake-up of the computer is achieved by the network interface device 204 asserting its wake pin. Assertion of the wake pin asserts wake signal line 104. Power management subsystem 102 detects assertion of wake signal line 104 and restores power to all components of computer system 100, and boots the system into full operation.

Figure 4:
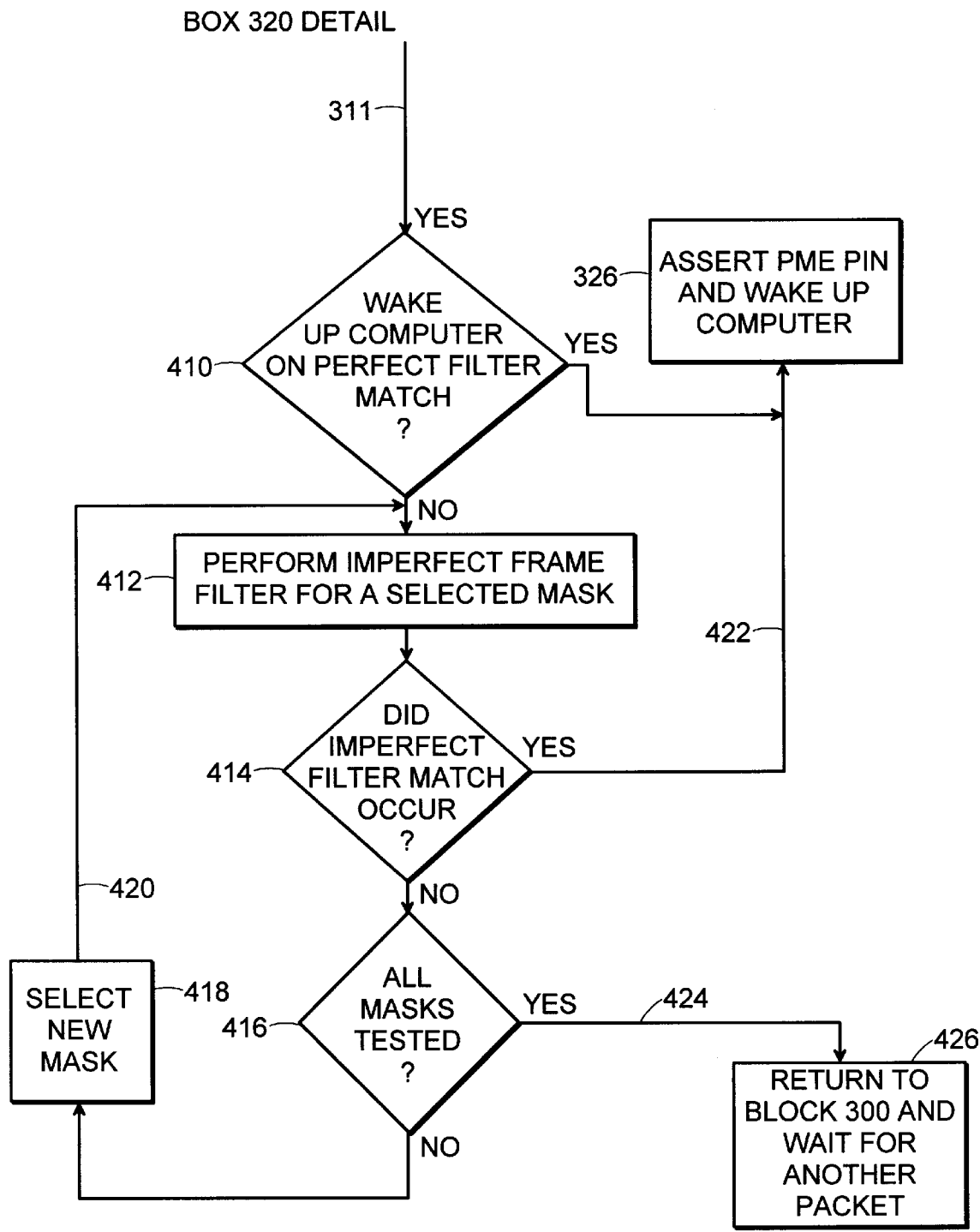
FIG. 4 is a detailed flow chart of a filtering method.

Turning now to FIG. 4, the internal detail of block 320 is shown. Operation passes from path 311 to decision block 410.

Decision block 410 provides the possibility of waking the computer in the event that one of the perfect filter matches occurred. Decision block 410 can be programmed to answer "Yes" in the event that any one of the perfect filtering comparisons of block 402 matched. In the event that decision block 410 answers "Yes", perfect filtering has been selected to wake-up the computer, and then the process goes to block 326 (shown in FIG. 3) where wake pin 203 is asserted in order to wake-up the computer. In the event that decision block 410 answers "No", that perfect filtering alone has not been selected to wake-up the computer, then the process goes to block 412.

At block 412 an imperfect filtering calculation is performed. In a preferred embodiment of the invention, masks are used to select bytes from the packet for a hash function calculation. A mask is selected and a hash function is calculated from that mask. Upon completion of the hash function calculation, the process goes to decision block 414.

At decision block 414 a test of the imperfect filtering calculation of block 412 is performed. In the event that a match occurred in the block 412 calculation, decision block 414 answers "Yes" and the process goes along path 422 to block 326 where the wake pin 203 is asserted and the computer is awakened. In the event that decision block 414 answers "No", that a match did not occur, then the process goes to decision block 416. At decision block 416 a test is performed to determine if all masks have been tested at block 412. In the event that not all masks have been tested, the process goes to block 418.

At block 418 a new mask is selected for the calculation of block 412, and the process goes along path 420 to block 412 where the calculation for the new mask is performed. The process continues around the loop through decision block 416 and block 418 until all masks have been tested. After all masks are tested, decision block 416 answers "No", and the process returns along path 422 to block 300 in order to wait for reception of another packet.

In the event that decision block 414 answers "Yes", that a match did occur in an imperfect packet filter calculation, then the process goes along path 424 to block 426.

In an exemplary embodiment of the invention, it has been found to be convenient to implement perfect filtering for the two addresses mentioned above. The first address for which perfect filtering has been found to be convenient is the station address, also known as the station "unicast address". The station unicast address is a 48 bit address. The second address for which perfect filtering has been found to be convenient is the broadcast address, which is 48 "1" bits, or in hex, FF FF FF FF FF FF. In an exemplary embodiment of the invention, sixteen registers are implemented for perfect filtering, and so sixteen 48 bit addresses may be used for perfect filtering, for example, 14 other addresses in addition to the station unicast address and the broadcast address.

IMPERFECT PACKET FILTER CALCULATION

The imperfect packet filter calculation is done by a CRC redundancy check machine implemented in silicon. The CRC hardware is used to calculate the hash function used in imperfect filtering. The standard CRC calculation is described next.

CALCULATION OF FRAME CHECK SEQUENCE

As set forth in IEEE 802.3-1985 Standard at paragraph 3.2.8, a cyclic redundancy check value is computed as follows. The computed cyclic redundancy check is then stored in the frame check sequence, FCS, field of the IEEE 802.3 standard packet.

A cyclic redundancy check (CRC) is used by the transmit and receive algorithms to generate a CRC value for the FCS field. The frame check sequence (FCS) field contains a 4-octet (32-bit) cyclic redundancy check (CRC) value. This value is computed as a function of the contents of the source/address, destination/address, length, LLC data, and pad (that is, all fields except the preamble, SFD, and FCS). The encoding is defined by the following generating polynomial.

$$G(x)=x^{32}+x^{26}+x^{23}+x^{22}+x^{16}+x^{12}+x^{11}+x^{10}+x^8+x^7+x^5+x^4+x^2+x+1$$

Mathematically, the CRC value corresponding to a given packet is defined by the following procedure: (1) The first 32 bits of the packet are complemented. (2) The n bits of the packet are then considered to be the coefficients of a polynomial M(x) of degree n−1. (The first bit of the destination address field corresponds to the x(n−1) term and the last bit of the data field corresponds to the X0 term.) (3) M(x) is multiplied by X32 and divided by G(x), producing a remainder R(x) of degree<31. (4) The coefficients of R(x) are considered to be a 32-bit sequence. (5) The bit sequence is complemented and the result is the CRC. The 32 bits of the CRC value are placed in the frame check sequence field so that the X31 term is the leftmost bit of the first octet, and the X0 term is the rightmost bit of the last octet. (The bits of the CRC are thus transmitted in the order X31, X30, . . . , X1, X0.)

It is to be understood that a CRC calculation is a type of hash function calculation. Generally, in a hash function calculation, a large number of bytes of data are represented by a small number of bits. The hash function generates the small number of bits from the large number of bytes of data. The small number of bits may represent more than one combination of bytes of data, however in the present invention, the lack of unique representation of the large number of bytes is of no concern. If there is an inadvertent match with the CRC calculation, the computer will simply receive a spurious wake-up call, and this occurrence will be a very rare occurrence.

It is to be further understood that the CRC calculation can be done on the basis of a polynomial of order 16. A CRC calculation done with a polynomial of order 32 is referred to as a CRC32 calculation. A CRC calculation done with a polynomial of order 16 is referred to as a CRC16 calculation.

CALCULATION OF FILTER FUNCTION

The hash function calculation is next described. In a preferred embodiment of the invention, the imperfect packet filter function is performed as a 16 bit CRC calculation, performed as described above in the description of the IEEE standard 802.3 frame check sequence calculation. The 16 bit CRC calculation uses the polynomial, $$G(x)=x^{16}+x^{15}+x^2+1$$

The 16 bit result of the CRC calculation is the resultant hash function. This 16 bit result is compared with at least one, and in an exemplary embodiment of the invention with several, desired 16 bit values. In the event that the 16 bits resulting from the hash function calculation matches one of a plurality of desired 16 bit values, then a match has occurred, and computer 100 is awakened.

In a preferred embodiment of the invention, where N imperfect filters are used, there are N 16 bit CRC machines implemented in the silicon chip so that the N filters may be processed in parallel. This parallel processing minimizes the delay introduced in packet processing by the filtering process. For example, in a system having four imperfect filters implemented in four sets of registers such as are shown in FIG. 14 hereinbelow, four CRC16 machines are implemented in the silicon chip.

Each mask which is used in the hash function calculation is conveniently compared with a desired 16 bit value associated with that mask.

TYPICAL PACKET FORMATS

Figure 5:
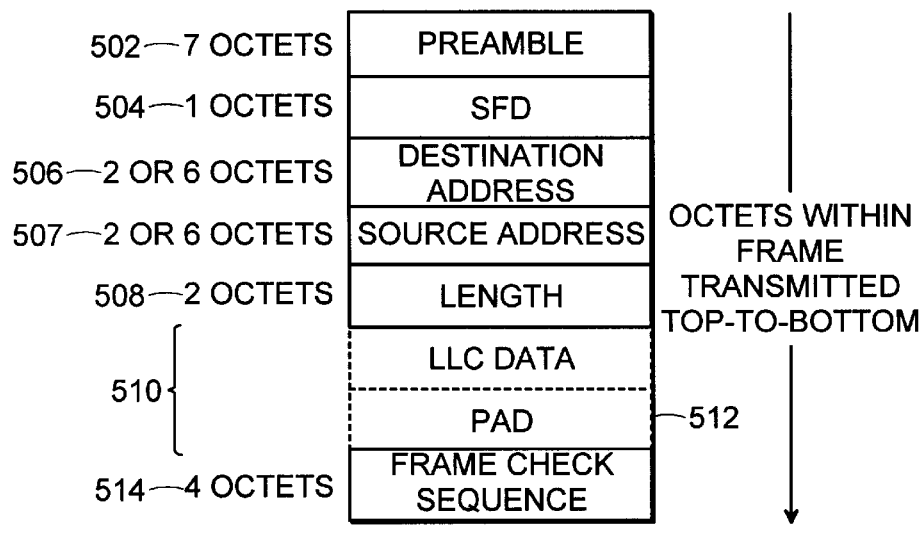
FIG. 5 is a packet format diagram for an IEEE 802.3 MAC frame.

Turning now to FIG. 5, the format of an IEEE 802.3 MAC packet (often referred to as a MAC frame) is shown. Only IEEE 802.3 MAC packets having a 48 bit DA or SA win be discussed, and 16 bit DA and SA frames are not further discussed as a person of ordinary skill in the art can apply the teachings of this invention to addresses of any length. The IEEE 802.3 MAC packet must be at least 64 bytes in length and not more than 1518 bytes, including the CRC field.

Field 502 is 8 octets (a "byte" and an "octet" are synonyms) of preamble. Field 504 is one octet of SFD, Start of Frame Delimiter. Field 506 is 6 octets (or 48 bits) of Destination Address. Field 507 is 6 octets (or 48 bits) of Source Address. Field 508 is 2 octets of length information. Field 510 is the data. The data field may be between 0 octets and 1500 octets. Field 514 is the frame check sequence field, and is 4 octets.

A summary of field lengths for an IEEE 802.3 MAC packet are as follows:

| | |
|---|---|
| Preamble | 7 bytes |
| SFD | 1 byte |
| Destination Address (DA) | 6 bytes |

-continued

| | |
|---|---|
| Source address (SA) | 6 bytes |
| Type field | 2 bytes |
| Data | 0–1500 bytes |
| Pad | 0–46 bytes |
| CRC | 4 bytes |

Figure 6A:
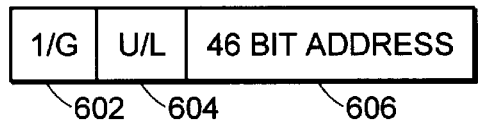
FIG. 6 is a format diagram of an IEEE 802.3 48 bit address.
Figure 6B:

Turning now to FIG. 6, the bit format of a 48 bit (or 6 octet) address is shown. Field 602 is the I/G (individual/group) field, is one bit: and =0 for an individual address; or =1 for a group address. Field 604 is the U/L (administration field) field, is one bit, and: =0 when the address is a globally administered address; and =1 when the address is a locally administrated address. Field 606 is a 46 bit address.

Figure 7:
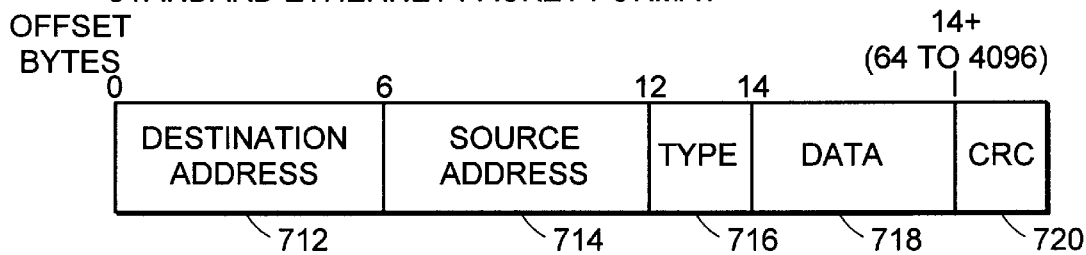
FIG. 7 is a packet format diagram for an Ethernet packet.

Turning now to FIG. 7, the format of an Ethernet packet is shown. Field 712 is a destination address. Field 714 is a source address. Field 716 is a "type" field. Field 718 is the data. Field 720 is the cyclic redundancy check, CRC field. Field lengths in bytes are given hereinabove.

Byte offset is indicated above the field boundaries. The destination address field 712 begins at offset 0. Source address field 714 begins at offset 6. Type field 716 begins at offset 12. Data field 718 begins at offset 14.

Turning now to FIG. 8, the format of a unicast IP (Internet Protocol) packet is shown. The destination address XX XX XX XX XX XX is shown in field 802, at Ethernet byte offset of 0.

Field 812 contains, at Ethernet byte offset 12, the packet type which has a 2 byte value of 08 00. Also, field 812 is the packet type field 716 of FIG. 7.

The field pattern in hex is shown in column 814. A comment describing the field is shown in column 816. The IEEE 802.3 offset is also shown in column 818, and is the Ethernet offset plus 7 bytes of preamble and one byte of "start frame delimiter" SFD, for a total of 8 bytes difference, as shown in FIG. 7.

ALTERNATIVE EMBODIMENTS OF THE INVENTION

Alternatively, the packet filtering machine may have a plurality of modes of operation, where exemplary modes of operation include:

1. Perfect filtering -the machine has 16 different addresses stored in it and it checks to see if the receiving packet destination address is a match to any one of them. If it matches, the packet is received, and the computer wake-up cycle initiated. This mode is normal DA address filtering.

2. In a further exemplary embodiment of the invention, an unicast address is first filtered against the station system address, and in the event that a match occurs, the other filters are tested in order to determine if the computer wake-up cycle should be initiated. In the event that no match occurs, the packet is ignored.

3. A plurality, such as four (4) CRC16 filters, are used in a hash function filter method. Each filter has the following:

1. 32 bits mask: each bit in this mask corresponds to one byte in the detected packet. If the bit is in '1', the corresponding byte is taken into the CRC16 calculation.
2. 8-bit offset -a "pointer" into the packet to tell from which byte to start the CRC16 computation. The pointer and the mask are used cooperatively to locate the bytes to be used in the CRC16 calculation.

In an exemplary embodiment of the invention (implemented as a preferred embodiment in the design of a specific network interface device 204 chip) the minimum value of the offset is 12, and therefore the CRC16 calculation skips the destination address (6 bytes) as it is compared in the perfect filter stage, and also skips the source address (6 bytes).

In a further exemplary embodiment of the invention, the apparatus reads a field of the received packet and increments the offset in order to accommodate the packet protocol. The packet protocol of a VLAN packet is accommodated in this way by: first reading the VLAN type in the type field at offset 12 in bytes 12–13; and, then in the event that the VLAN type is detected, incrementing the offset to the value of 16. VLAN detection is further disclosed hereinbelow.

3. a 16-bit CRC16 "selected CRC value" to compare with the results of the CRC16 calculation done on the bytes of the detected packet.

4. Selection bits may be used. For example, the selection bits, in an exemplary embodiment of the invention, may have the following values and meanings:

4.1. Multi-unicast. If "set" (1), the filter applies to multicast frames only. If "clear" (0), the filter applies to unicast frames only.

4.2. Inverse: if set, the matching signal is asserted only if there were not a match.

4.3. Add-previous: If set, perform a logical AND operation between the result of the previous filter and the result of the present filter.

4.4. Enable filter. Filter is activated only if this bit is set.

5. A "global-unicast control bit" which commands the apparatus to assert the wakeup signal if the received packet is a unicast packet (first bit of the destination address is zero), without any further pattern check.

6. VLAN support. A VLAN packet, or frame, is identical to a non_VLAN packet with the exception that a four (4) byte VLAN header is inserted between the Source Address field 714 and the Frame Type field 716. Accordingly, for a given protocol VLAN and non_VLAN packets share the same wake-up pattern but at a different offset (4 bytes difference).

It is believed that the VLAN type designation has not been chosen by a standards body as of the date of filing this patent application. However, the type is expected to be assigned to bytes 12–13. The other two bytes of the VLAN header, bytes 14–15, will be a VLAN identifier, VID. Also, priority information will be assigned to some of the bytes 14–15 bits, as will a bit indicating fragmentation in Ethernet packets.

In order to avoid duplication of patterns stored in registers of network interface device 204, the invention includes a mechanism to share the same wake-up pattern between VLAN and non_VLAN frames. The mechanism is, a VLAN packet is identified if the type field 716 has the VLAN value, as programed into the pattern filter's command and status register. In the event that the packet is a VLAN packet, the value of the offset is automatically incremented to be at least large enough to skip the VLAN header.

For example, when the minimum offset is 12 bytes and the VLAN header is 4 bytes, then the increment is 4 bytes. The offset then becomes a total of 16 bytes. Thereby, the CRC16 hash function calculation is performed as though the 4 byte VLAN header were not there. That is, in a filter looking for a VLAN packet, the hash function calculation starts at the filter's offset +4 bytes, which is at an offset value of 16.

The offset is thereby dynamically changed. The filter checks type field 716 for the VLAN type. In the event that the VLAN type is discovered, the offset is incremented in order to skip the VLAN header. This dynamic adjustment of the offset permits accommodation of VLAN packets without duplicating the mask in another filter register.

Dynamic adjustment of the offset, dynamic adjustment of the mask, or dynamic adjustment of any other filter parameter can be done in response to information read from the detected packet. Changing the filter parameters in response to information read from a detected packet provides a mechanism to reduce storage requirements while permitting the invention to respond to a wide variety of packet protocols for the purpose of responding to the detection of a desired packet, such as waking a sleeping computer.

MASK FOR IMPERFECT PACKET FILTERING

An exemplary mask used for imperfect packet filtering is given below, with assumptions numbered 1–3.

1) MASK (this exemplary mask is 32 bits in length, so it therefore refers to 32 bytes of the received packet)

0F 01 00 00 (32 bits expressed in hex)

00001111 00000001 00000000 00000000 (32 bits in binary)

2) OFFSET=12 The minimal offset is 12 bytes to skip the DA and the SA, and so in this exemplary embodiment the offset is assumed to be 12 bytes.

3) PACKET:

00 01 02 03 04 05 06 07 08 09 0A 0B 0C 0D 0E 0F 10 11 12 13 14 15 16 17 18 19 1A 1B 1C 1D 1E 1F 20 21 22 23 24 25 26 27 28 29 2A 2B 2C 2D 2E 2F 30 31 XX XX . . . CRC

The bit order within the byte of the mask goes from the least significant bit (bit 0) to the most significant bit (bit 7). Therefore, in the example the first byte of the mask is 0x0F, meaning that the unmasked bytes are:

offset+0
offset+1
offset+2
offset+3
offset+8.

For the assumed offset of 12, the unmasked bytes are :12, 13, 14, 15, and 18, or: 0C 0D 0E 0F 14.

So looking at the mask given above, the following bytes will be entered into the CRC 16 computation machine, and no other bytes from the packet: 0C 0D 0E 0F 14.

In a further exemplary embodiment of a mask, if the offset were 16 (meaning that we skip the first 16 bytes of the packet), then the bytes that will be entered into the CRC16 machine computation are: 10 11 12 13 18.

TYPICAL WAKE-UP PACKETS

Turning now to FIG. 9, the format of an ARP Request packet, as defined in IP version 4, is shown. As shown in field 902, the destination address is at Ethernet offset 0, is the broadcast address, and the hex pattern is FF FF FF FF FF FF, which is 48 "1" bits in binary. Field 904 gives the ARP protocol type at Ethernet offset 12 as, 08 06. Field 906, at Ethernet offset 21, contains 01. Field 908, at Ethernet offset 38, contains XX XX XX XX, meaning that an IP address is requested.

Turning now to FIG. 10, the format of a "NBT Name Query/Registration for Computername" packet, as defined in IP version 4 is shown. Field 1002, at Ethernet offset 00 is the broadcast destination address, and contains: FF FF FF FF FF FF. Field 1004 at Ethernet offset 12 is the Type Field, and is: 08 00. Field 1006, at Ethernet offset 23 contains: 11. Field 1007, at Ethernet offset 34 contains: 00 89 00 89. Field 1008, at Ethernet offset 45, contains: 10. Field 1010 at Ethernet offset 54 contains 20. Field 1012 at Ethernet offset 55, contains: 32 bytes for holding the name of the computer.

Turning now to FIG. 11, the format of a Neighbor Solicitation packet, as defined in IP version 6, is shown. Field 1102 contains the destination address, the broadcast address of FF FF FF FF FF FF. Field 1104, at Ethernet offset 12, contains: 08 00, indicating that the packet is an IP type packet. Field 1106, at Ethernet offset 38, contains an IP destination address.

By way of explanation, In order to resolve IP to physical address translation, IPv6 uses the Neighbor Discovery Protocol. The Neighbor Discovery Protocol permits nodes to detect and determine each other's addresses. When a node needs to resolve the Unicast IPv6 address of a neighbor, the node sends a Neighbor Solicitation (NS) packet to the solicited-node multicast address corresponding to the target address. The solicited node multicast address is computed as a function of the solicited target's address, and is formed by taking the low order 32 bits of the target IP address and appending those bits to the 96 bit prefix:

FF02:0:0:0:0:1 to produce a multicast address. For example, the solicited node multicast address corresponding to the IP address:

"4036:0:0:0:1:800:200E:8C6C"is

"FF02:0:0:0:0:1:200E:8C6C"

In the Neighbor Solicitation (NS) packet, the solicited node multicast address is the Destination Address in the IP header.

It is often desirable to awaken a sleeping computer when a Neighbor Solicitation (NS) packet directed to the sleeping computer is detected by the sleeping computer.

Turning now to FIG. 12, the format of an unicast IPX packet is shown. Field 1202, at Ethernet offset 00 contains the unique unicast destination address. Field 1204, at Ethernet offset 12, contains 81 37, indicating that the protocol type is IPX. Three packet types, with different values at Ethernet offset 14 are shown:

field 1206 for an Eth__SNAP packet, at Ethernet offset 14, contains: AA AA 03 00 00 00 81 37.

field 1208, for a Eth__802.3 packet, has at Ethernet offset 14 the value: FF FF, indicating that the protocol type is IPX.

field 1210, for an Eth__802.2 packet, at Ethernet offset 14 contains: E0 E0 03.

Turning now to FIG. 13, the format of a IPX Diagnostic Responder Request packet is shown. Field 1301, at Ethernet offset 00, contains the broadcast address FF FF FF FF FF FF. Different filed contents are shown for different packet types:

field 1302, for an EthII packet, contains: at Ethernet offset 12: 81 37 indicating an IPX protocol type; and, at Ethernet offset 30: 04 56, indicating a IPX destination socket diagnostic request.

field 1304, for an Eth__SNAP packet, contains: at Ethernet offset 14: AA AA 03 00 00 00 81 37, indicating an IPX SAP protocol type, and at Ethernet offset 38: 04 56, indicating an IPX destination socket diagnostic request.

field 1306, for an Eth__802.3 packet, at Ethernet offset 14 contains: FF FF, and at Ethernet offset 30 contains: 04 56.

field 1308, for an Eth__802.3 packet, at Ethernet offset 14, contains: E0 E0 03; and at Ethernet offset 33 contains 04 56.

FILTER REGISTERS

Turning now to FIG. 14, there are shown eight VC Filter registers, R0 through R7, for performing imperfect filtering. Each register is a 32 bit register. In an exemplary embodiment of the invention, these eight registers implement four imperfect filters. The filters are referred to as filter #1 through filter #4. Registers R0, R1, R2, R3, R4, R5, R6, R7 are implemented in the VC Filter 220 portion of network interface device 204.

Each filter uses a byte mask. Registers 0, 1, 2, and 3 contain the byte masks, where the byte masks are of length 32 bits. Each bit of the mask selects a byte from the received packet for the CRC 16 hash function calculation. Therefore, the pattern of 32 bytes is compressed by the CRC 16 hash function calculation to a 16 bit value.

Register 4 contains four 1 byte commands, one command associated with each filter..

Register 5 contains four 1 byte offsets, one offset associated with each filter. The offset determines which byte of the packet that the first bit of the mask is associated with, and therefore which byte is selected if the first bit of the mask has the value "1".

Registers 6 and 7 each contain a 2 byte desired CRC value (16-bit), for a total of four desired CRC values, where each is associated with one of the filters. The desired CRC value contained in Registers 6 and 7 are compared with the CRC values computed during the imperfect filter hash function calculation, in order to determine whether or not the computer should be awakened from the low power state upon reception of the packet, as explained more fully with reference to FIG. 3 and FIG. 4.

Turning now to FIG. 15, commands controlling imperfect filtering logic are given. The commands are contained in the four 1 byte fields of Register 4 of FIG. 14. Each 1 byte field has 8 bits. Bits 07:04 are reserved, and are not used in the present exemplary embodiment of the invention.

Bit 03, the And_Previous bit, implements Boolean logic. When set, the result of the current entry is logically ANDed with the result of the previous filter. This AND logic allows a filter pattern longer than 32 bytes, by splitting the mask between two filters, three filters, or four filters, depending on how many of the filters have the And_Previous bit set. For filter #1, the And_Previous bit chains the filter with the result of the global unicast filtering of the previous stage, thereby potentially rejecting the global unicast packet for wake-up by applying additional logic in the next stage of filtering.

Bit 02, the Address_Type bit, indicates the destination type (Unicast or Broadcast) of the packet.

1: Broadcast

0: Unicast

If bit 02=1, the CRC calculation for filtering is done for only a broadcast packet.

If bit 02=0, the CRC is calculated only for a unicast packet.

The packet destination address is filtered by the adapter's Destination Address filter. A mismatch between the Address_Type bit and the Address_Type signal provided by the Destination Address filter prevents the CRC from being calculated, and therefore there is no match.

Bit 01, the Inverse Mode bit, when set, reverses the logic of the CRC 16 hash function signal, to make a match become a packet rejection. Together the Inverse Mode bit with the And_Previous mode, allows rejection of a subset of wake-up packets by creating filter logic such as "Pattern 1 AND NOT Pattern 2".

Bit 00, the Enable Filter bit, when set, enables the filter.

Turning now to FIG. 16, the Byte Mask is shown. The mask is 32 bits in length. Each bit points to a byte in the detected packet. If the bit of the mask is set to a value of "1", the corresponding byte of the packet is used in the CRC 16 hash function calculation. If the bit of the mask is "0", the corresponding byte of the packet is not used during the CRC 16 hash function calculation.

Turning now to FIG. 17, the filter byte offset is shown. The byte offset contains a value, which value is the number of bytes of offset before the byte mask is applied to the bytes of the detected packet. Offset value "0" is the first byte of the frame's destination address. Offset value "12" is the first byte of the packet's "type" field, as shown in FIG. 7.

Turning now to FIG. 18, the "Pattern's CRC" value is shown. The pattern's CRC value for a specific filter is determined, in an exemplary embodiment of the invention, by first entering the byte pattern of the packet for which it is desired to awaken a sleeping computer, where the pattern is entered into driver software which operates network interface device 204. The associated byte mask and the associated Offset are also entered into the driver software. Network interface device 204 then computes the CRC 16 hash function by using both the entered packet pattern, the entered Offset, and the entered byte mask. The result of the computation is then written into the "Pattern's CRC" value register, the field of registers R6 or R7 of FIG. 14 associated with the specific filter.

ACCESS TO FILTER REGISTERS

In an exemplary embodiment of the invention, it is convenient to use management packets to enter data into the software driver which operates network interface device 204. In an alternative embodiment, an operator at the keyboard of the particular computer enters the desired data into an interface to the driver software.

Access to the Registers used by the filters is accomplished by the driver software.

The Network Interface Device 204 has two (2) input/output (I/O) Register banks: CSR 0–15 and CSR+1–2. The selection of the bank is done through "CSR0<Enable_CSR+_Bank>" (bit_26).

The filter's registers are mapped in the CSR+bank:

The Power Management Event Command/Status Register is mapped as CSR2+.

The filter's registers, Registers 0–7 are accessed sequentially through CSR1+:

Setting the CSR0<Enable_CSR+_Bank>(bit_26) automatically resets the register's pointer to Reg0. Therefore the init sequence is:

Set CSR0<Enable_CSR+_Bank>

Load Reg0_value in CSR1+

Load Reg1_value in CSR1+

Load Reg2_value in CSR1+

Load Reg3_value in CSR1+

Load Reg4_value in CSR1+

Load Reg5_value in CSR1+

Load Reg6_value in CSR1+

Load Reg7_value in CSR1+

Reset CSR0<Enable CSR+Bank>

The driver executes this sequence of register initialization steps whenever it is desired to enter data into the pattern filter Registers 0–7

PACKET TYPES FOR AWAKENING A SLEEPING COMPUTER

An exemplary list of packets, in an exemplary embodiment of the invention, for which it is desirable to awaken a computer is set forth hereinbelow. The computer is awakened from being asleep, that is from being in a low power state, when the packet is detected by the network subsystem. Included in the list are the following packet types:

Unicast IP: as shown in FIG. 8, and containing the Destination Address of the computer.

ARP Request: as shown in FIG. 9, and as defined for IP version 4.

NBT Name Query/Registration: as shown in FIG. 10, and as defined for IP version 4.

Neighbor Solicitation: as shown in FIG. 11, and as defined for IP version 6.

Unicast IPX: as shown in FIG. 12.

IPX Diagnostic Responder Request: as shown in FIG. 13.

The above packet types are merely representative of the packet types for which it is desirable to awaken a sleeping computer from a low power state to a fully powered state. As new network protocols are developed, and as new packet types are defined, it may become desirable to awaken a sleeping computer by detection of one of the new packets. Alternatively, it may become desirable to awaken a sleeping computer by detection of other currently defined packets. For example, it may be desirable to awaken a sleeping computer upon receipt of other types of packets, such as Appletalk packets, Banyan-vines packets, etc. The present invention may usefully be employed to awaken a sleeping computer by detection of many different types of packets by simply defining a mask which selects bytes useful for identifying the packet, and selecting an offset so that the mask points to the useful bytes. The expected hash function is then stored into the CRC register associated with the selected filter.

For example, the wake up filter will work for any packet protocol for which the computer operating system implementing the protocol stack makes the computer power manageable. Currently, it is known that Microsoft Windows NT 5.0 and Microsoft "Windows 98" provide power management for the IP protocol. These operating systems also provide some power management for the Novel IPX protocol Other operating systems may provide power management in other protocol stacks in the future. The present inventive filter provides flexibility to accommodate future developments in operating system design and packet formats, by use of the mask, the And_Previous functionality, and the offset setting.

EXAMPLE: FILTERING FOR AN ARP REQUEST PACKET

For example, a filter for an ARP Request packet will next be described. Imperfect filter #1 is used in this exemplary embodiment of the invention to filter for an ARP Request packet.

The protocol address of the target computer is assumed to be: 157.55.199.72 (=9d37c748 hex). The ARP Request packet has this Protocol Address in its data field, and this Protocol Address is selected by the byte mask for use in the CRC calculation of this exemplary filtering calculation. In the examples, the indication "xx" means that the filtering function under discussion does not care what data is loaded into the position xx. The ARP Request packet has the following data:

FF FF FF FF FF FF xx xx xx xx xx xx 08 06 xx xx xx xx xx xx xx 01 xx xx xx xx xx xx xx xx xx xx xx xx xx xx xx 9d 37 c7 48

The packet's destination address is the broadcast address FF FF FF FF FF FF because an ARP Request packet has a broadcast address. One of the destination addresses for the perfect filtering function loaded in the MAC filter is also a broadcast address.

The CRC loaded into the filter is calculated from the ARP Request packet data, starting at offset 12 within the ARP Request packet with the associated byte mask:

binary: 1100 0000 0100 0000 0000 0000 0011 hex: C080003C

CRC16 (08 06 01 9d 37 48)=0263 hex.

The CRC loaded into the filter is calculated from ARP Request packet data, starting at offset 12 within the ARP Request packet:

08 06 00 00 00 00 00 00 00 01 00 00 00 00 00 00

00 00 00 00 00 00 00 00 00 00 9d 37 c7 48 with the associated byte mask:

binary: 0011 1100 0000 0000 0000 0010 0000 0011 hex: 3C000203

The same byte mask is loaded into a register of the filter for use in filtering bytes from any packet detected by the network subsystem, as described hereinbelow.

Assuming that filter #1 in the imperfect filtering function is used to filter for ARP Request packets, then:

Register R0 contains Byte mask #1(32 bits):

binary: 1100 0000 0100 0000 0000 0000 0011 1100 hex: C080003C

Register R4, in Command #1 field (8-bit) contains:

bit 07:04 reserved bit 03 "1" (And_Previous command)

bit 02 "1" (Address_Type, indicating a Broadcast type packet is being filtered for)

bit 01 "0" (Inverse mode command, value "0" indicates inverse AND logic is used with the perfect filtering function)

bit 00 "1" (Enable Filter command) the value of "1" enables filter # 1.

Register R5, at Offset #1 field (8-bit): contains hex 12 to indicate a 12 byte offset.

Register R6, at CRC 16 #1 field (16-bit): contains the hash result obtained by performing a CRC 16 calculation on the byte pattern which the filter is looking for, by computing the result using the byte mask and the offset. The contents of Register R6 is the result calculated as described above for the ARP Request packet. The contents of Register R6, at CRC #1 field, is the expected value which will be produced by the CRC 16 calculation when an ARP Request packet is:

CRC16 (08 06 01 9d 37 48)=0263 hex.

The contents of Register R6, at CRC #1 field is this expected value which will be produced by the CRC16 calculation when an ARP Request packet is detected by the network subsystem.

REGISTER CONTENTS FOR EXEMPLARY WAKE-UP PACKETS

The following tables provide contents of the registers for exemplary packets used to awaken a sleeping computer.

1. Unicast IP to Node having the address AB-00-04-01-D9-FA:

Wake Up pattern:

| Offset (bytes) | Pattern (hex) | |
|---|---|---|
| 00 | AB 00 04 01 D9 FA | Destination MAC Address (Station Addr) |
| 12 | 08 00 | Protocol Type (IP) |

Filter's Registers:

| Register's Filter [n] | Value (hex) | |
|---|---|---|
| Byte Mask | 00000003 | pattern's bytes: 12, 13 |
| Offset | 0C | offset = 12 |
| Command | 01 | address_type = unicast, enable_filter |
| CRC16 | 7006 | CRC16 (08, 00) |

2. Ipv4 ARP Request to Node 157.55.199.72 (0x9d37c748):

Wake Up pattern:

| Offset (bytes) | Pattern (hex) | |
|---|---|---|
| 00 | FF FF FF FF FF FF | Destination MAC Address (Broadcast) |
| 12 | 08 06 | Protocol Type (ARP) |
| 21 | 01 | ARP Opcode (Request) |
| 38 | 9d 37 c7 48 | IP Address requested |

Filter's Registers:

| Register's Filter [n] | Value (hex) | |
|---|---|---|
| Byte Mask | 3C000203 | pattern's bytes: 12, 13, 21, 38 . . . 41 |
| Offset | 0C | offset = 12 |
| Command | 09 | address_type = multicast, enable_filter |
| CRC 16 | 0263 | CRC 16 (08, 06, 01, 9d, 37, 47, 48) |

3. Ipv4 NBT Name Query/Registration for Computername <00>, <03>, <02>"DIGITAL"

Wake Up pattern:

| Offset (bytes) | Pattern (hex) | |
|---|---|---|
| 00 | FF FF FF FF FF FF | Destination MAC Address (Broadcast) |
| 12 | 08 00 | Protocol Type (IP) |
| 23 | 11 | Protocol (UDP) |
| 34 | 00 89 00 89 | Port Number (NETBIOS Name Service) |
| 45 | 10 | NetBIOS Flags (Query OR Registration) |
| 54 | 20 | Name scope - NULL |
| 55 | 45 45 45 50 45 48 45 50 46 45 45 42 45 4D 43 41 43 41 43 41 43 41 43 41 43 41 43 41 43 41 | Computername: 30_bytes field coding in half-ASCII the name of the computer. |

Filter's Registers:
1. Full pattern:

| | Value (hex) | |
|---|---|---|
| Register's Filter [n] | | |
| Byte Mask | 03C00803 | pattern's bytes: 12, 13, 23, 34, . . . 37 |
| Offset | 0C | Offset = 12 |
| Command | 09 | address_type = multicast, enable_filter |
| CRC16 | 8F7E | CRC16 (08, 00, 11, 00, 89, 00, 89) |
| Register's Filter [n + 1] | | |
| Byte Mask | 7FFFFFFF | pattern's bytes: 54 . . . 84 |
| Offset | 36 | Offset = 54 |
| Command | 0D | and_previous, address_type = multicast, enable_filter |
| CRC16 | BC5F | CRC16 (00, 46, 48 . . . 43, 41) |

An exemplary translation of Command Bits into a hex representation follows. Note that the Command Field has the contents 0D hex. Reference to FIG. 15 shows that bit 3 is set to specify multicast address. Bit 2 is set in order to activate the And_Previous logic. Bit 0 is set to enable the filter. Translation of these "set" bits to hex is as follows:

bit 76543210

0 0 0 0 1 1 0 1=0D hex

Bits 7, 6, 5, and 4 are reserved for future assignment.

2. Simplified pattern (Computername field only):

| Register's Filter [n] | Value (hex) | |
|---|---|---|
| Byte Mask | 7FFFFFFF | pattern's bytes: 54 . . . 84 |
| Offset | 36 | Offset = 54 |
| Command | 09 | address_type = multicast, enable_filter |
| CRC16 | BC5F | CRC16 (00, 46, . . . 43, 41) |

4. IPv6 Neighbor Solicitation to Node 4037.0.0.0.1.800.200E.8C6C

Wake Up pattern:

| Offset (bytes) | Pattern (hex) | |
|---|---|---|
| 00 | FF FF FF FF FF FF | Destination MAC Address (Broadcast) |
| 12 | 08 00 | Protocol Type (IP) |
| 38 | FF 02 00 00 00 00 00 00 00 00 00 01 20 0E 8C 6C | IP Destination Address (Target's solicited-node multicast address) |

Filter's Registers:

| Register's Filter [n] | Value (hex) | |
|---|---|---|
| Byte Mask | 0000FFFF | pattern's bytes: 38 . . . 53 |
| Offset | 26 | Offset = 38 |
| Command | 09 | address_type = multicast, enable_filter |
| CRC16 | 6F0E | CRC16 (FF, 02 . . . 8C, 6C) |

5. Unicast Eth_802.2 IPX to node AB-00-04-01-D9-FA

Wake Up pattern:

| Offset (bytes) | Pattern (hex) | |
|---|---|---|
| 00 | AB 00 04 01 D9 FA | Destination MAC Address (Station Addr) |
| 14 | E0 E0 03 | SAP + Control (IPX) |

Filter's Registers:

| Register's Filter [n] | Value (hex) | |
|---|---|---|
| Byte Mask | 00000007 | pattern's bytes: 14 . . . 16 |
| Offset | 0E | Offset = 14 |
| Command | 01 | address_type = unicast, enable_filter |
| CRC16 | F779 | CRC16 (E0, E0, 03) |

6. Eth_802-2 IPX Diagnostic Responder Request: Wake Up pattern:

| Offset (bytes) | Pattern (hex) | |
|---|---|---|
| 00 | FF FF FF FF FF FF | Destination MAC Address (Broadcast) |
| 14 | E0 E0 03 | SAP + Control (IPX) |
| 33 | 04 56 | IPX Destination Socket (Diagnostic Request) |

Filter's Registers:

| Register's Filter [n] | Value (hex) | |
|---|---|---|
| Byte Mask | 00180007 | pattern's bytes: 14 . . . 16, 33, 34 |
| Offset | 0E | Offset = 14 |
| Command | 09 | address_type = multicast, enable_filter |
| CRC16 | E8E0 | CRC16 (E0, E0, 03, 04, 56) |

SELF TEST WITH ERROR MESSAGE TRANSMITTEED ON THE NETWORK

After a computer is awakened, it is desirable to test the components of the computer in order to determine if the components are functional. Hardware, such as power supply voltage, fan operation, chassis intrusion, etc. can be detected directly by appropriate sensors. CPU operation, memory function, etc., can be tested by execution of a self test computer program. In the event that any component fails, or the self test fails, the inventive computer system transmits a message onto the network in order to inform proper authorities that the failure has occurred.

Figure 19:
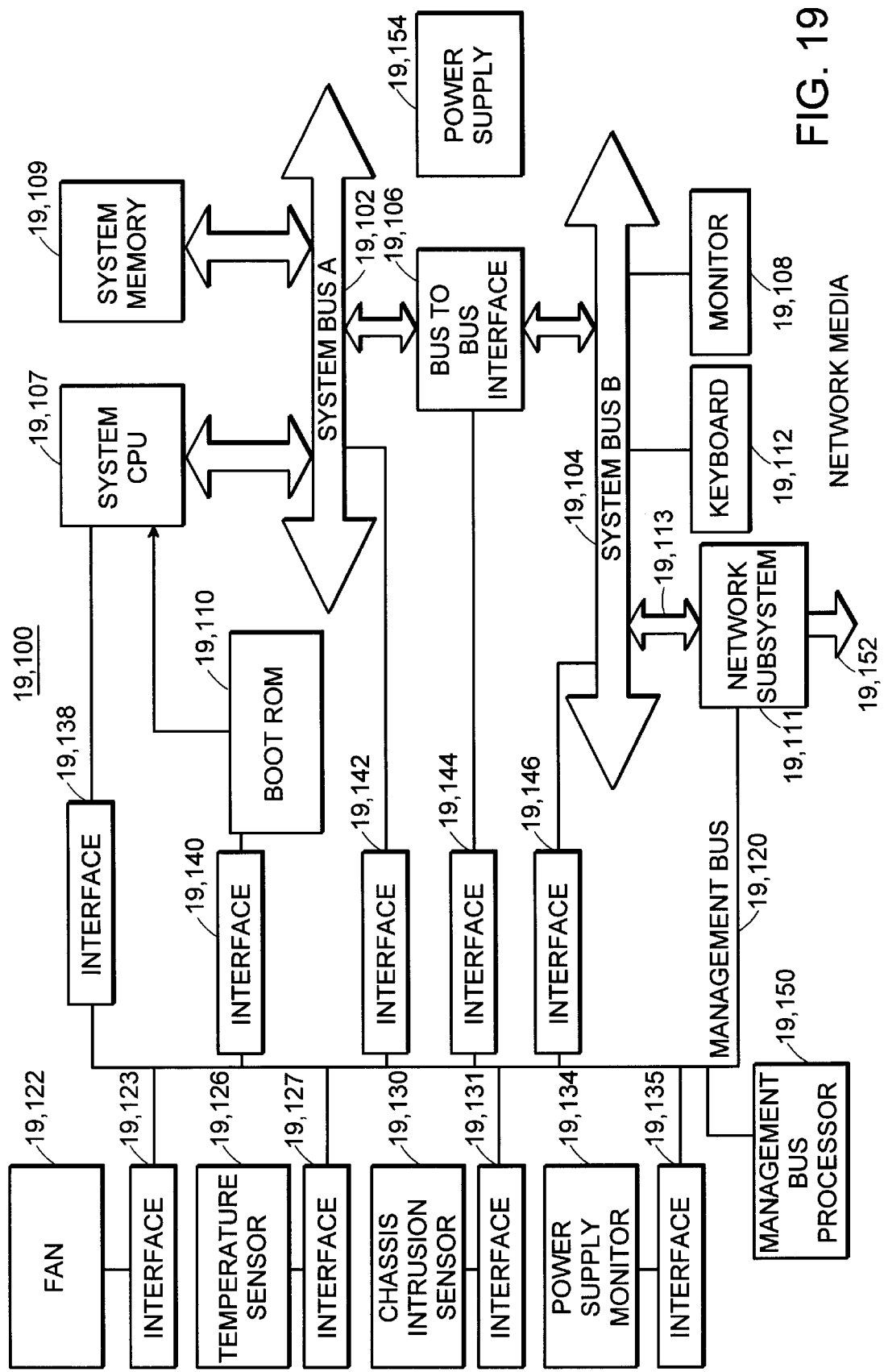
FIG. 19 is a block diagram of a computer system.

Turning now to FIG. 19, a fault may occur in a computer 19,100. For example, a system bus A 19,102 or system bus B 19,104 may fail so that it can no longer transfer messages between units of the computer. The computer 19,100 is shown as a complex system with a two system buses 19,102, and 19,104 linked by a bus to bus interface 19,106. System CPU 19,107 and system memory 19,109 are both coupled to system bus A 19,102, where, for example, system bus A provides a high speed communication path between system CPU 19,107 and system memory 19,109. System bus B 104 provides a lower speed connection for input or output, and is shown connected to the network subsystem 19,111, the monitor 19,108, and the keyboard 19,112. Bus connection 19,113 connects network subsystem 19,111 with system bus B 19,104.

Also, a component may fail. And with the component failure, any of the system buses may be dragged down so the entire computer 19,100 fails. Upon the failure of a component of a computer, it is desirable for a technician to run a diagnostic program in order to have the program report the nature of the fault. If the fault is not too serious, such a program can execute, and can report what it finds to be the nature of the fault. The diagnostic program usually presents a message on the screen of a monitor 19,108 attached to the computer, so that the technician can read the message, and then the technician takes the appropriate corrective action.

A further method to diagnose a fault in a computer is for the computer 19,100 to execute a self test. A computer is often commanded to execute a self test, especially after power is restored to a sleeping computer. A self test may be executed upon boot up of the computer, for example, by the computer 19,100 reading self test instructions from a boot ROM 19,110. Also, a self test may be executed during operation of the computer by a user initiating a command to execute the self test by entering a command from a keyboard 19,112. A computer may pass the self test, or alternatively, the computer may fail the self test. Upon failure of the self test, the computer usually presents an error message on the screen of the monitor 19,108. The message is read by a user who interprets the message, and the user then initiates action to repair the computer.

Figure 23:
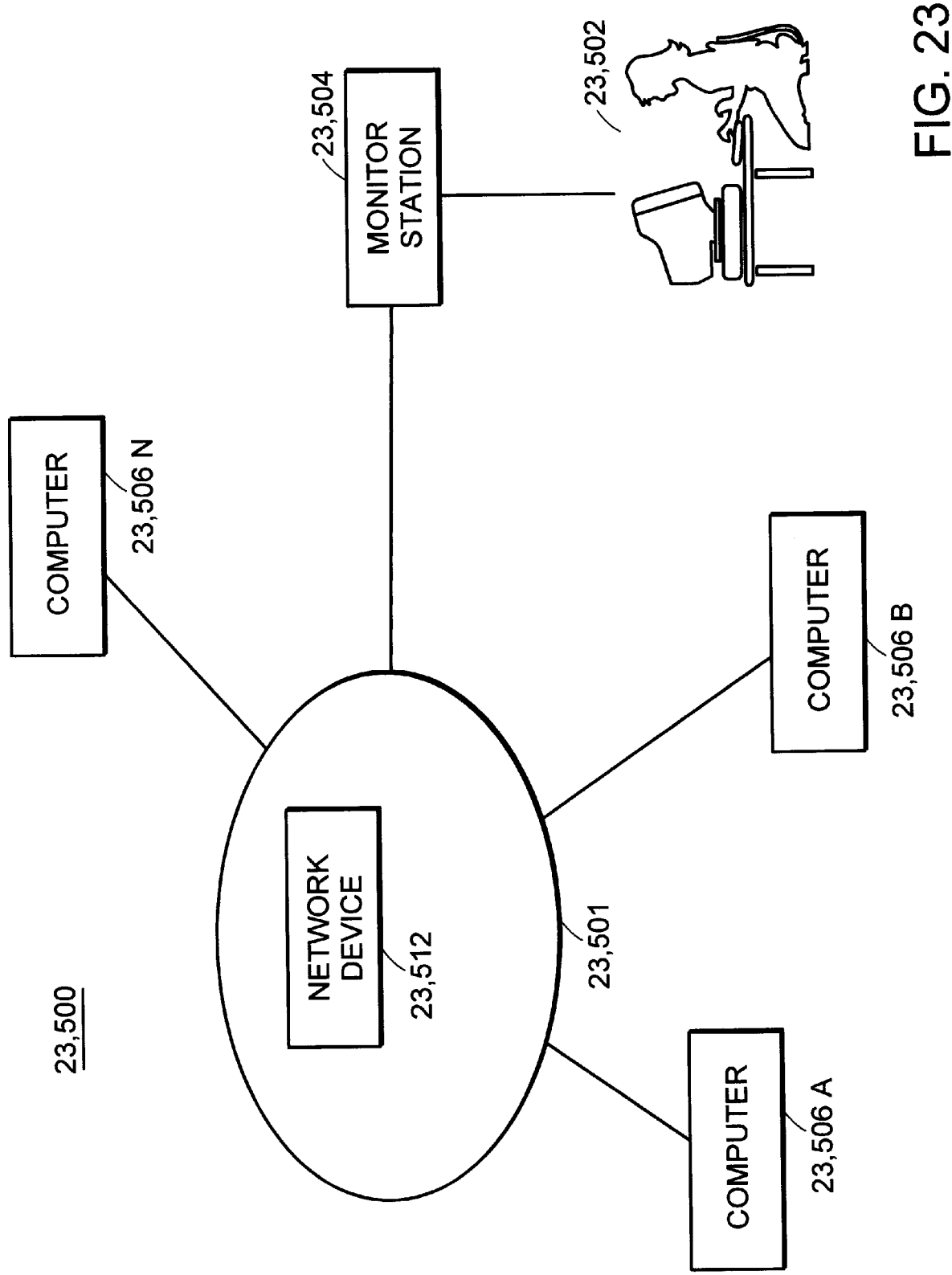
FIG. 23 is a block diagram of a network.

Operation of a computer network 23,500, as shown in FIG. 23 with network cloud 23,501, is often controlled by a person designated as a manager 23,502. The manager 23,502 has a computer, designated monitor station 23,504, connected to the network 23,500. The manager's computer can execute commands which initiate actions in the various computers 23,506A, and 23,506B, and 23,506N, etc. connected to the network. There may be hundreds or thousands of computers 23,506A . . . 23,506N connected to the network cloud 23,501. The manager's computer 23,504 can often be used to read status information concerning various computers connected to the network. Also, the manager's computer 23,504 can be used to control and read status from network devices 23,512 installed within the network.

Also, a manager may be able to initiate a diagnostic program to run on a remote computer 23,506A . . . 23,506N, or on a network device 23,512 by the transfer of a command in a management packet over the network to the remote computer.

A problem in network management is presented when a computer fails a diagnostic test or fails a self test. A computer which fails a test is at least partly inoperative, and often the CPU, the memory unit, or the system bus of the computer failing the test is not functioning. An inoperative computer cannot transmit a message over the network, and so the manager is not aware of the problem with the inoperative computer.

Also, network devices such as repeaters, routers, bridges, brouters, switches, servers, etc. may be required to execute a diagnostic test. In the event that the processor in a network device is inoperative, then the network device simply fails to respond to the manager's command to execute the diagnostic test. Network devices are often installed in "network closets", which are small rooms distributed in many buildings. The buildings may be near to each other, such as clustered on a "campus". Alternatively, the buildings may be in different cities, different states, or on different continents. The common thread is that all of the network devices are connected by the computer network. It is very desirable for a technician at one location to be able to run diagnostic programs, to boot up a network device, and to monitor the result of the diagnostic program, or the result of an attempted boot up of a network device. Hereinafter a network device is included within the meaning of the general term "computer".

Computer 19,100 has a management bus 19,120, where management bus 19,120 is coupled to sensors which monitor status of components of the computer. For example, a fan 19,122 which provides cooling for the computer is connected to interface 19,123, and interface 19,123 is coupled to management bus 19,120.

Also, for example, temperature sensor 19,126 is coupled to interface 19,127, and interface 19,127 is coupled to management bus 19,120. Several temperature sensors can be installed in order to monitor temperatures at different locations within the chassis of the computer.

Also, for example, chassis intrusion sensor 19,130 is coupled to interface 19,131, and interface 19,131 is coupled to management bus 19,120. The power supply can be turned off in the event of a chassis intrusion, that is, someone opens the chassis of the computer. Also, an alarm message signaling a chassis intrusion can be sent over the network to the system manager.

Also, for example, power supply monitor 19,134 monitors power supply voltages, and is coupled to interface 19,135. Interface 19,135 is coupled to management bus 19,120. The actual voltage and current on each power supply circuit can be monitored and reported to the system manager 23,502 by transmission of a message over the network. Alternatively, power supply monitor 19,134 can have limits set therein, and a message is transmitted to the system manager 23,502 in the event that a voltage or current exceeds the set limits.

Also, for example, interface 19,138 couples the system CPU 19,107 to management bus 19,120. Parameters indicating the activity of the CPU can be placed in a message which is transmitted to the system manager 23,502.

Also, for example, boot ROM interface 19,140 couples boot ROM 19,110. Boot ROM interface 19,140 can command the computer to perform a boot in order to re-initialize the computer. Alternatively, boot ROM interface 19,140 reports the result of an attempted boot to the management bus 19,120, and the result can be placed in a message which is transmitted to the system manager 23,502. The result of an attempted boot, as transmitted over the network by the invention, can tell the system manager 23,502 whether or not the attempted boot was successful.

Also, for example, interface 19,142 couples system bus A 19,102 to management bus 19,120. Activity on the system bus A 19,102 can then be reported to the system manager 23,502 by transmission of a message over the network.

Also, for example, interface 19,144 couples bus-to-bus interface 19,106 to management bus 19,120. Activity on the bus-to-bus interface 19,106 can then be reported to the system manager 23,502 by transmission of a message over the network.

Also, for example, interface 19,146 couples system bus B 19,104 to management bus 19,120. Activity on the system bus B 19,104 can then be reported to the system manager 23,502 by transmission of a message over the network.

The management bus 19,120 is coupled to a management bus processor 19,150, where the management bus processor 19,150 receives status information from the management bus 19,120 concerning status of components of the computer. Also, the management bus processor 19,150 can issue Commands to the various interfaces to management bus 19,120 in order to control some of the components. For example, the fan 19,122 can be commanded to run faster or slower, depending upon a reading from the temperature sensor 19,126. Also, for example, the power can be turned off by power supply monitor 19,134 in the event that the chassis intrusion sensor 19,130 reports that the chassis has been opened. Management bus processor 19,150 is alternatively referred to as the management bus controller.

Figure 22:
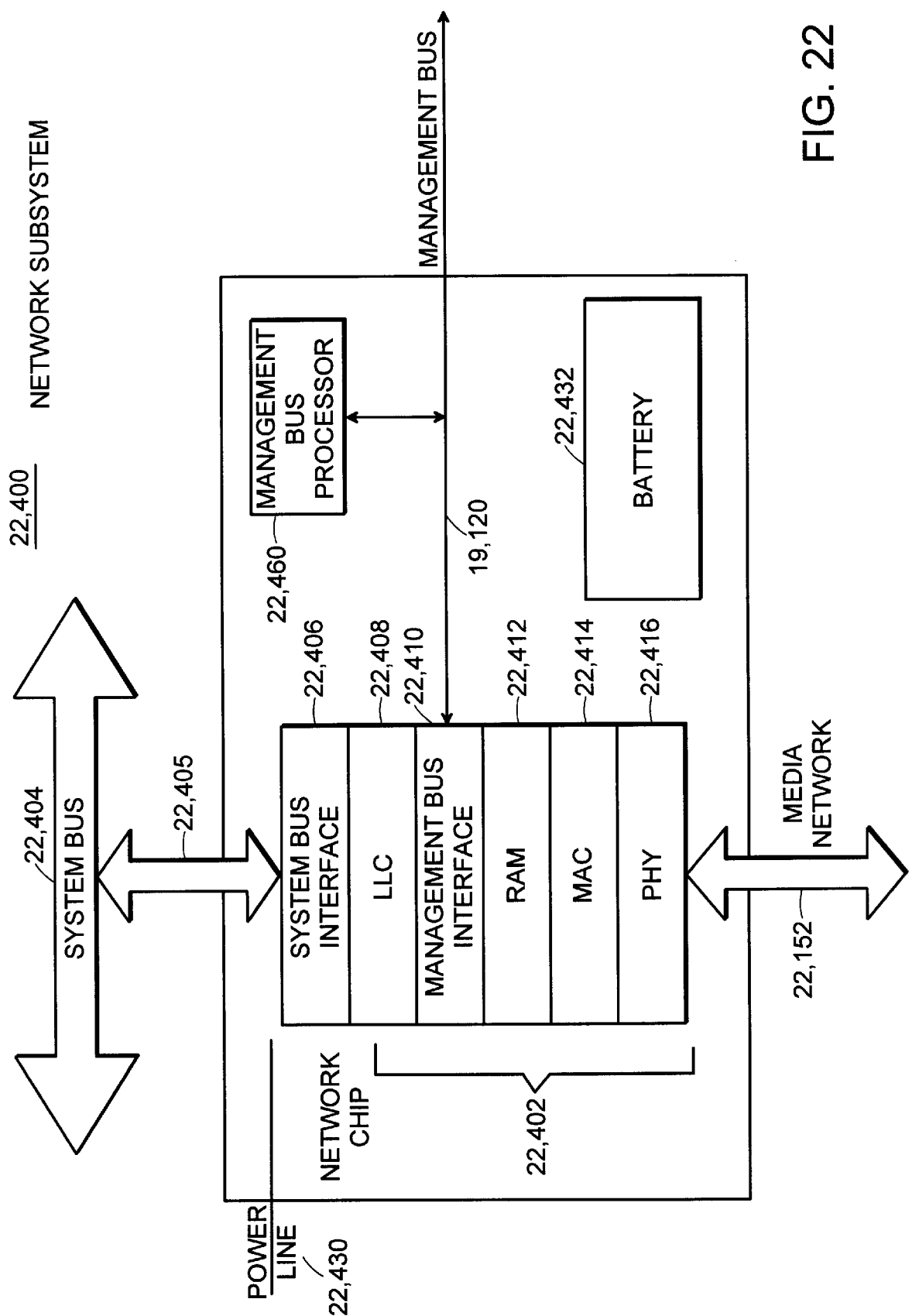
FIG. 22 is a block diagram of a network subsystem.

Management bus 19,120 is coupled to the network subsystem 19,111 so that status information passed to the management bus 19,120 is collected into a packet by the management bus processor 19,150 and delivered to the MAC machine 22,414 (as shown in FIG. 22) of the network subsystem 19,111. The management bus 19,120 can deliver packets to the MAC machine 22,414 of the network subsystem 19,111 totally independent of the system bus 19,102, or system bus 19,104. The packets delivered by the management bus 19,120 are transmitted onto the network media 19,152 by the network subsystem 19,111. The packets so transmitted may be received by a network manager 23,502 (shown in FIG. 23), and so the network manager 23,502 becomes informed that a fault has occurred in the computer 19,100. The nature of the fault is also available to the network manager 23,502 as the status which the broken computer 19,100 can provide is carried in the packet delivered by the management bus 19,120 to the MAC machine 22,414.

The invention is a very clever improvement in the network subsystem which permits the delivery of packets to the MAC machine 22,414 of the network subsystem by a "backdoor" route. The MAC machine 22,414 ordinarily receives and transmits packets which pass over the system bus 19,102, and 19,104. The present invention opens a "backdoor" into the MAC machine 22,414, for the management bus 19,120 to transmit status information to the network manager 23,502.

The backdoor route permits status packets to be transmitted onto the network by the computer even though the entire computer system, except for DC power and the system clock, is inoperative. And, in an alternative embodiment of the invention, a rechargeable battery 22,432 (FIG. 22) mounted in the network subsystem frees transmission of status packets onto the network from system power supply 19,154. In another alternative embodiment of the invention, the transmit clock within network chip 22,402 (FIG. 22) is used to operate the invention, thereby freeing the transmission of status packets from the system clock.

Figure 20:
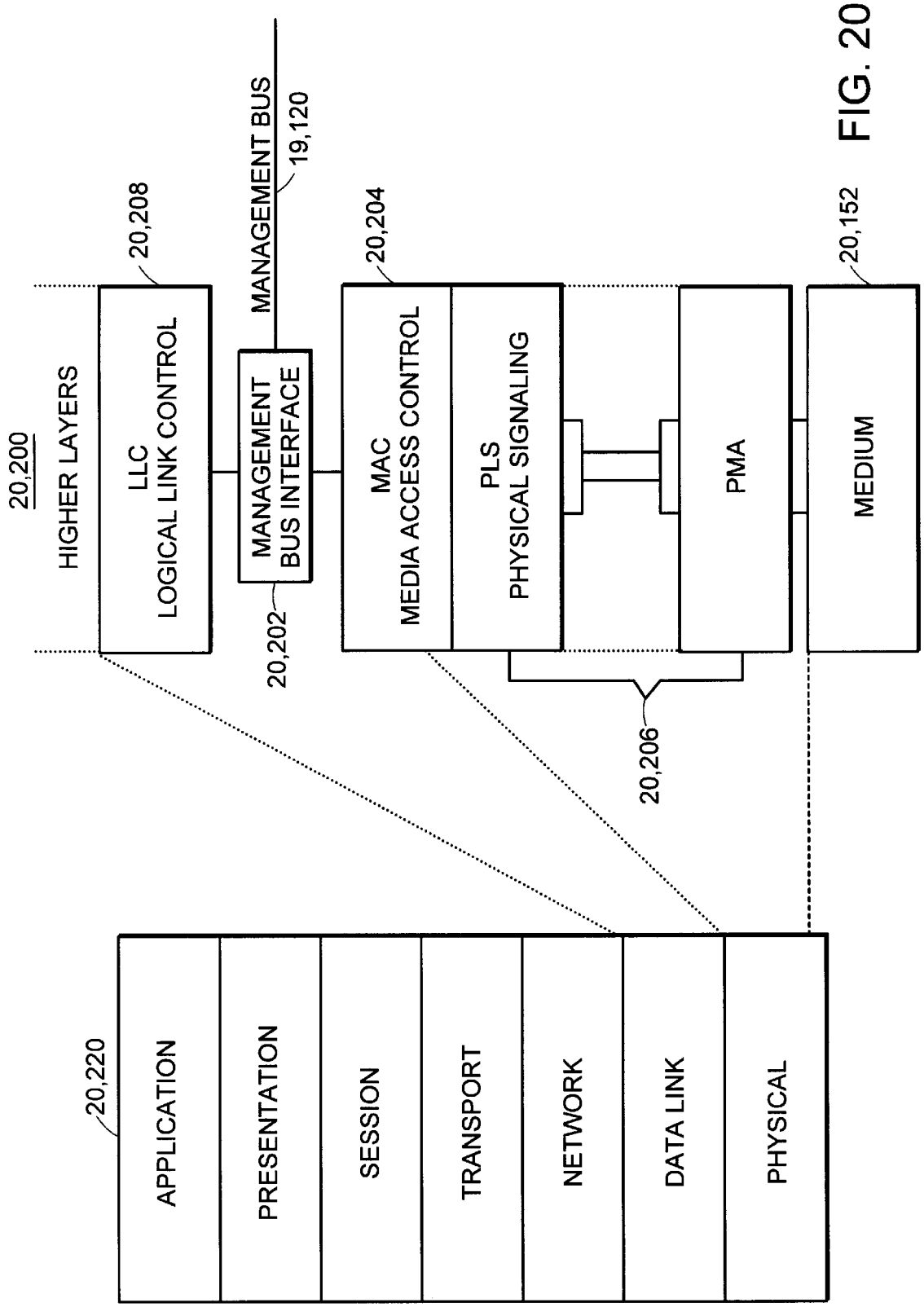
FIG. 20 is a diagram of a protocol stack of the invention.

Turning now to FIG. 20, a protocol stack 20,200 for the MAC machine 22,414 is shown. Further, a comparison is shown with the Open System Interconnection (OSI) Standard protocol stack 20,220. (The OSI model is described in the textbook *Computer Networks, Second Edition*, by Andrew S. Tanenbaum, published by Prentice Hall, Englewood Cliffs, N.J., 1988, all disclosures of which are incorporated herein by reference. The OSI model is shown at page 20.) Interface 20,202 receives packets from management bus 19,120 and transfers the packets to the MAC protocol layer 20,204. MAC protocol layer 20,204 then transfers the packet to the physical layer 20,206 for transmission onto network media 19,152.

Figure 21:
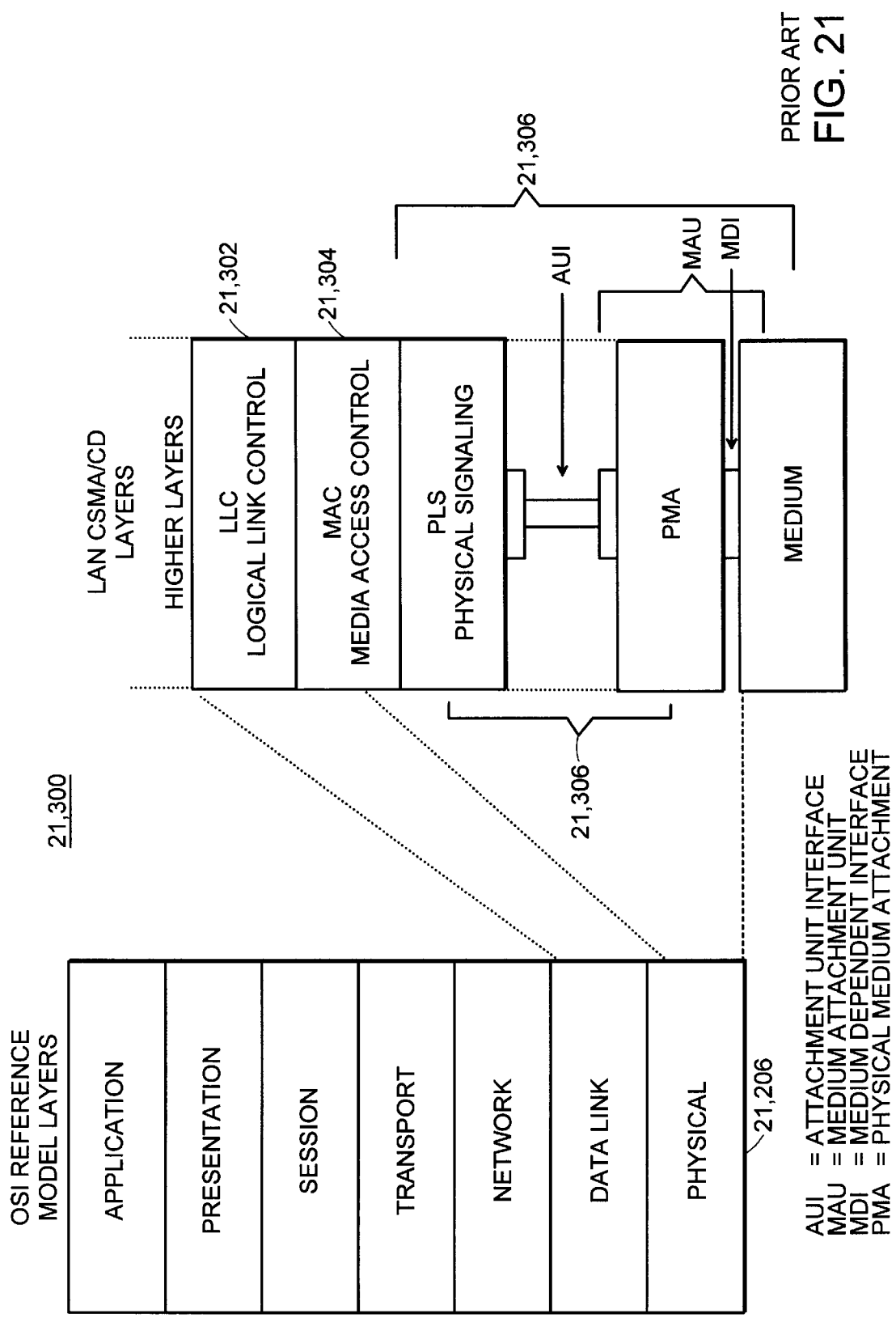
FIG. 21 is a diagram of a prior art protocol stack.

Turning now to FIG. 21, a prior art protocol stack 21,300 is shown. Protocol stack 21,300 is taken from the publication ISO/IEC 8802-3, ANSI/IEEE Std. 802.3, Fifth Edition Jul. 29, 1996, Part 3, "Carrier sense multiple access with collision detection (CSMA/CD) access method and physical layer specifications" at page 17, all disclosures of which publication are incorporated herein by reference.

The inventive LLC protocol layer 20,208 corresponds substantially to the standard LLC protocol layer 21,302, except that the inventive LLC protocol layer 20,208 interoperates with management bus interface 20,202.

The inventive MAC protocol layer 20,204 corresponds substantially to the standard MAC protocol layer 21,304, except that the inventive MAC protocol layer 20,204 interoperates with management bus interface 20,202.

The inventive physical protocol layer 20,206 corresponds substantially with the standard physical protocol layer 21,306, as the inventive physical layer 20,206 simply accepts and delivers packets to/from the MAC protocol layer 20,204, and delivers and accepts packets from/to the network media 19,152.

Turning now to FIG. 22, a block diagram of network subsystem 22,400 is shown. Network chip 22,402 is shown as implemented in a single silicon computer chip. Alternatively, network chip 22,402 may be implemented as a set of chips which are interconnected within network subsystem 22,400. Network chip 22,402 connects to system bus 22,404 through system bus interface 22,406. Bus connection 22,405 connects system bus interface 22,406 with system bus 22,404.

LLC machine 22,408, of network chip 22,402, implements the Logical Link Control sublayer 20,208 of the protocol stack 20,200 shown in FIG. 20.

Management bus interface 22,410, of network chip 22,402, connects to management bus 19,120, and also provides pass through of messages to and from LLC machine 22,408. Management bus interface 22,140 receives bytes from management bus 19,120, forms the bytes into network packets, and passes the packets formed from the management bus bytes to MAC machine 22,414. MAC machine 22,414 then passes the network packet containing the management bus bytes to the PHY machine 22,416, where the network packet is transmitted onto the network media 19,152.

In an alternative embodiment of the invention, RAM 22,412 contains data which is used in constructing the packet containing bytes received from management bus 19,120. For example, RAM 22,412 contains the destination address of the network packet containing management bus bytes. Also, for example, the management bus byte is read by management bus interface 22,-410, and responsive to the contents of the byte, an error message is selected from a plurality of error messages stored in RAM 22,412. The error message is then included in the network packet transmitted in response to the management bus bytes. By using the management bus byte as a pointer to a standard error message, the system manager is not required to keep a list of interpretations of assorted bytes implemented by different manufacturers in different models of computers and network devices.

Further, by simply using the different management bus bytes which have been implemented by manufacturers of computers as pointers to error messages stored in RAM 22,412, problems with broken computers can be standardized for the assistance of the system manager 23,502. In operation, a network chip 22,402 with an empty RAM 22,412 is supplied to a computer manufacturer. The manufacturer then installs the network chip 22,402 into a variety of computers. Each computer of the variety may use a different set of bytes on management bus 19,120 to indicate different status values, or different problems, within the computer. At boot-up time for the computer, software simply loads the RAM 22,412 with a table of bytes used in that particular computer, and with error messages appropriate to each byte in the table. Also the name, physical address, possibly the location by city and street address, the building floor number and pole number, and other identifying indicia of the computer are written into RAM 22,412 by software. For example, RAM 22,412 may have data written therein by management packets received from network media 19,152, and delivered to management bus interface 22,410. Then, when a byte is received by management bus interface 22,410 from management bus 19,120, the received byte is used as a pointer to the appropriate error message. The appropriate error message is then received by the system manager 23,502 so that he/she conveniently has a standardized error message, the network address and/or name of the transmitting computer, and possibly the city and street address of the computer along with the building floor number and pole number of the computer.

In a further alternative embodiment of the invention, use of management bus 19,120 includes responding to a packet received from the network, and in response thereto, writing bytes to management bus 19,120. For example, the packet could be received from the network as a management packet, pass along the system bus B 19,104 and system bus A 19,102, and system memory 19,108. For example, system CPU 19,107 then responds through interface 19,138 to generate activity on management bus 19,120.

As a further example, management bus interface 19,138 may write bytes intended for registers of various interfaces 19,123, or 19,144, or 19,127, or 19,131, or 19,135, or 19,138, or 19,140, or 19,142, or 19,146, etc., in order to control monitoring of computer 19,100. For example, these bytes may be written directly into the registers by management bus interface 19,138 through management bus 19,120, or may be forwarded to management bus processor 22,460, and then written to the registers by management bus processor 22,460, depending upon the protocol adopted for management bus 19,120.

A method of remotely re-booting computer 19,100 by action of system manager 23,502 when computer 22,400 fails to respond to ordinary network packets is provided by commanding computer 19,100 to execute a boot routine through a management packet. The management packet is received by network subsystem 22,400, and causes network subsystem to execute a hardware boot of computer system 19,100. Boot ROM then causes computer system 19,100 to execute a boot process, and the various interfaces on management bus 19,120 will signal to the network subsystem 19,111 any failures which are detected during the boot process. Network subsystem 19,111 then transmits an error message signaling the failure onto network media 19,152.

As a further example, a management packet can be received from network 19,152, be transferred as a standard management packet through system bus 22,404 or through system bus B 19,104 to the computer system CPU. Computer system CPU can then initiate action, including initiating a software or a hardware boot cycle. In the event that the boot cycle fails, then a failure message may be transmitted through management bus 19,120 onto network media 19,150. For example, interface 19,138 to system CPU 19,107 can report the results of a boot cycle through management bus 19,120, or alternatively interface 19,140 to boot ROM 19,110 can report the results of a boot cycle through management bus 19,120, or alternatively interface 19,142 to system bus A 19,102 can report the results of a boot cycle through management bus 19,120, or alternatively interface 19,144 to bus-to-bus interface 19,106 can report the results of a boot cycle through management bus 19,120, and alternatively, interface 19,146 to system bus B 19,104 can report the results of a boot cycle through management bus 19,120. The results of the boot cycle are then packaged into a network data packet by network subsystem 19,111 and transmitted on network media 19,152 for reception by a system monitor station 23,504 or system manager 23,502.

As a still further example, in the event that a system crash occurs in computer 19,100, any one of the interfaces 19,138, or 19,140, or 19,142, or 19,144, or 19,146, etc., can report the crash through management bus 19,120 as a failure message for transmission onto network media 19,150.

RAM 22,412, of network chip 22,402, provides random access memory for management bus interface 22,410. For example, RAM 22,412 may store byte tables for bytes used on management bus 19,120, may store addresses such as the address of computer 19,100, the address of monitor workstation 23,504, and may store error messages selected in response to bytes received from management bus 19,120, and etc.

MAC machine 22,414, of network chip 22,402, implements the Medium Access Control protocol of layer 20,204 of the protocol stack 20,200 shown in FIG. 20. MAC machine 22,414 interoperates with management bus interface 22,410 to transmit network packets onto network media 19,152 in response to bytes received by management bus interface 22,410 from management bus 19,120. Also, MAC machine 22,414 interoperates with management bus interface 22,410 to transmit bytes onto management bus 19,120 in response to network packets received from network media 19,152.

PHY machine 22,416 implements the physical protocol of physical layer 20,206 of the protocol stack shown in FIG. 20.

Power line 22,430 brings electrical power from computer power supply 19,154 to network subsystem 22,400. Network subsystem 22,400 is maintained powered up even when computer 19,100 fails, or when computer 19,100 is operated at reduced power. Accordingly, network subsystem 22,400, through operation of network chip 22,402, can transmit error messages onto network media 19,152 when all of computer 19,100 is non-functional except the power supply 19,154 which supplies power to power line 22,430. As a further back-up, battery 22,432 energizes network subsystem 22,400 in the event that power on power line 22,430 fails. By use of back-up battery 22,432, network subsystem 22,400 can transmit error messages onto network media 19,152 even when power supply 19,154 fails, thereby placing computer 19,100 into substantially total fault.

As an example, back-up battery 22,432 is continuously trickle charged through power line 22,430 whenever computer 19,100 is turned on. Battery 22,432 is then ready to electrically energize network subsystem 22,400 for the purpose of transmitting error messages onto network media 19,152 upon the failure of power supply 19,154. When backup battery 22,432 is used to energize network subsystem 22,400, computer 19,100 can transmit error messages onto the network even though its power supply 19,154 is non-functional.

Management bus processor 22,460 is connected to management bus 19,120. Management bus processor 22,460 operates management bus 19,120. For example, interfaces 19,123, or 19,126, or 19,127, or 19,131, or 19,135, or 19,138, or 19,140, or 19,142, or 19,146, etc. coupled to management bus 19,120 may communicate with management bus processor 22,460. In turn, management bus processor 22,460 communicates with management bus interface 22,410 in network chip 22,402. Accordingly, a manufacturer can establish his preferred protocol for use of management bus 19,120 and management bus processor 22,460. Management bus processor 22,460 then simply packages bytes received from management bus 19,120 and transmits them, again on management bus 19,120 with an appropriate address, to management bus interface 22,410. Management bus interface 22,410 then transfers the bytes to MAC machine 22,414 for generation of a network packet for transmission onto network medium 19,152, as described hereinabove.

Further, management bus processor 22,460 can receive command messages or inquiry messages from management bus interface 22,410. In response to the command or inquiry messages, management bus processor 22,460 generates the appropriate message for management bus 19,120 and transmits the message to the appropriate interface 19,123, or 19,126, or 19,127, or 19,131, or 19,135, or 19,138, or 19,140, or 19,142, or 19,146, etc. coupled to management bus 19,120.

As an example, management bus processor 22,460 is shown mounted in network subsystem 22,400 so that management bus processor 22,460 is powered by battery 22,432 in the event that power supply 19,154 fails. Failure of power supply 19,154 therefore brings down the entire computer, except those items powered by emergency battery 22,432, and so in the event of a power supply 19,154 failure, the network subsystem 22,400 can still generate meaningful error messages and transmit them onto network media 19,152.

Turning now to FIG. 23, operation of a computer network 23,500 is shown. Network 23,500 has network cloud 23,501. Various computers 23,506A, or 23,506B, . . . 23,506N, etc. are connected to network cloud 23,501. Network cloud 23,501 may contain much complexity, or network cloud 23,501 may represent a simple local area network. In any event, network cloud 23,512 contains network devices such as are schematically represented by network device 23,512. Network devices contained within network cloud 23,501, and which are responsible for operation of the network, include but are not limited to, routers, repeaters, bridges, servers, gateways between network segments having different protocols, brouters, and including any device useful for operation of a computer network.

End station computers 23,506A, or 23,506B, . . . 23,506N are connected to network 23,500 through network cloud 23,501. There may be hundreds or thousands of computers 23,506A . . . 23,506N connected to the network cloud 23,501.

Also, monitor station 23,504 is connected to network cloud 23,501. Monitor station 23,504 is used to monitor operation of network 23,500 by system manager 23,502. A network such as network 23,500 is often controlled by a person designated as a system manager 23,502, and system manager 23,502 makes use of monitor station 23,504. The manager can, through monitor station 23,504, execute commands which initiate actions in the various devices 23,512, and various end station computers 23,506A, or 23, 506B, . . . 23,506N, and can be used to read status information from various computers and network devices in network 23,500. Also, a system manager 23,502 may be able to initiate a diagnostic program to run on a remote computer 23, 506A . . . 23,506N, or on a network device 23,512 by the transfer of a command in a management packet over the network to the remote computer or device. As explained above, the management packet may cause the network subsystem to execute a hardware boot, in which case any failure in the boot cycle will be reported, through management bus 19,120 and network media 19,152, back to the system manager 23,502.

When a system manager 23,502 initiates a command to be executed on a network device 23,512 or on a remote computer 23,506A, or 23,506B, . . . 506N, then even though the computer is non-functional, an error message will be transmitted to the monitor station 23,504 by network subsystem 22,400 mounted within the non-functional computer or network device.

Turning now to FIG. 24 through FIG. 30, details of a preferred embodiment of management bus 19,120 are shown. Management bus 19,120 is, in the preferred embodiment, implemented in accordance with the I2C standard serial bus. "The I2C standard serial bus is described in the publication "*The I2C Bus and How to Use It* (including specifications)", published by the Phillips Semiconductor company in April 1995, all disclosures of which publication are incorporated herein by reference. Also, in the preferred embodiment management bus processor 22,460 is implemented as the Phillips PCF84C00 processor, described in the publication "*PCF84C00 8-bit Microcontroller with I2C bus*

*interface*", published by Phillips Semiconductors on Nov. 25, 1996, all disclosures of which publication are incorporated herein by reference.

Figure 24:
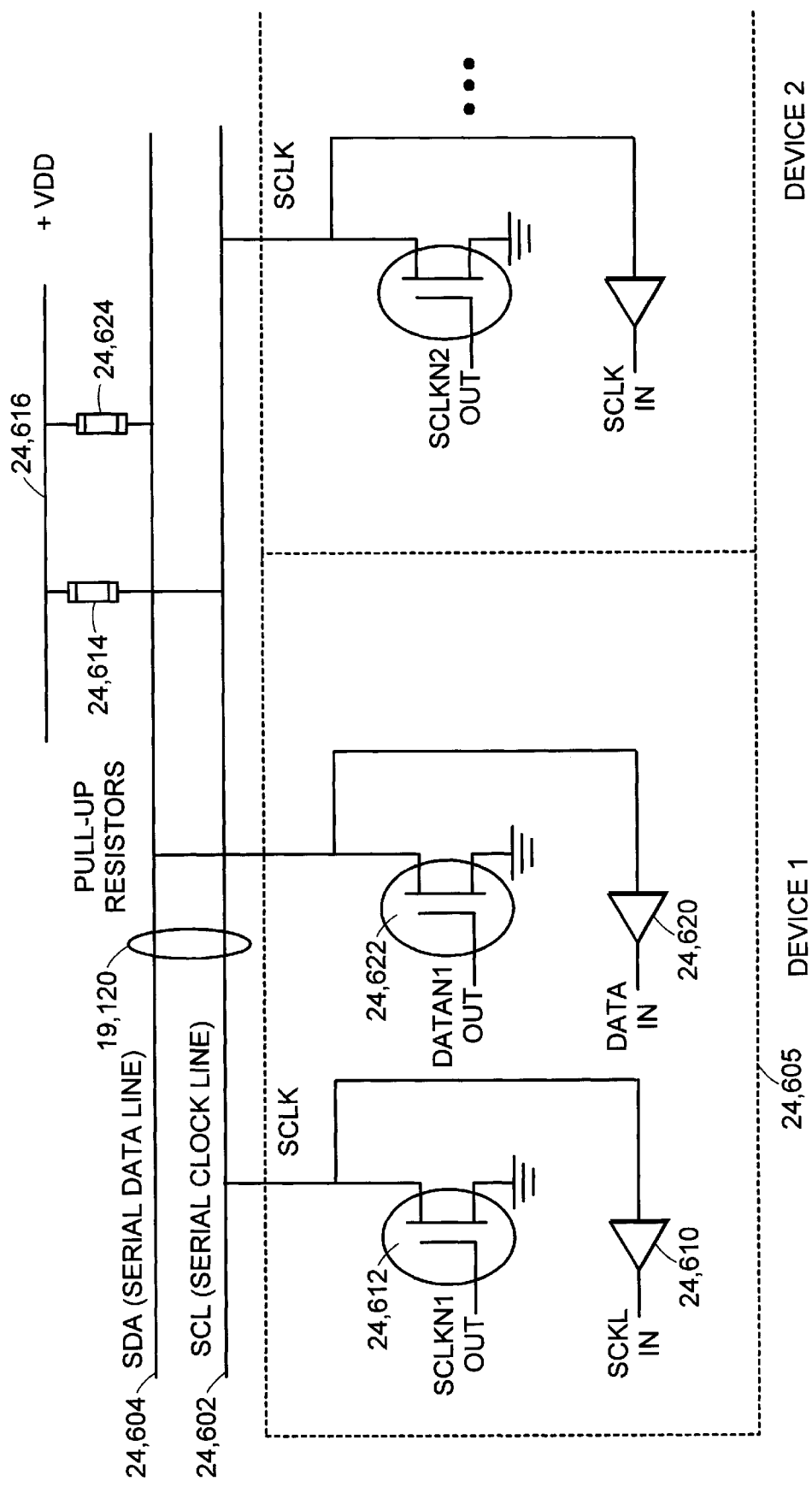
FIG. 24 is a schematic diagram of a two wire management bus.

Turning now specifically to FIG. 24, in the I2C standard implementation, management bus 19,120 is a two wire serial bus having serial clock line, SCL line 24,602 and having serial data line, SDA line 24,604. Devices are connected to the SCL line 24,602 serial clock line, and are connected to the SDA line 24,604 serial data line. The devices connected to management bus 19,120 SCL line 24,602 line and SDA line 24,604 are interfaces 19,123, or 19,144, or 19,127, or 19,131, or 19,135, or 19,138, or 19,140, or 19,142, or 19,146, etc., and management bus processor 22,460, and management bus interface 22,410 of network chip 22,402.

Device 1 24,605 is connected to SCL line 24,602 serial clock line by an operational amplifier 24,610 for input of clock pulses to the device 24,605, and for generating output pulses to SCL line 24,602 by a transistor 24,612. Transistor 24,612 operates through pullup resistor 24,614 to power supply line VDD 24,616. When transistor 24,612 is driven into conductance, SCL line 24,602 voltage goes to near ground value, and when transistor 24,612 is driven into cutoff SCL line 24,602 is driven near to the voltage of power supply line VDD 24,616. Transistor 24,612 permits other components, not shown, in device 1 24,605 to drive clock pulses onto SCL serial clock line 24,602.

Device 24,605 is connected to serial data line SDA line 24,604 by operational amplifier 24,620 for input of data pulses to device 24,605. Device 24,605 is connected through transistor 24,622 for output of data pulses from device 24,605 to SDA line 24,604. By operating through pullup resistor 24,624, when transistor 24,622 is driven into conductance SDA line 24,604 is driven near to ground potential, and when transistor 24,622 is driven into cutoff then SDA line 24,604 is driven near to power supply voltage VDD maintained on VDD line 24,616.

Figure 25:
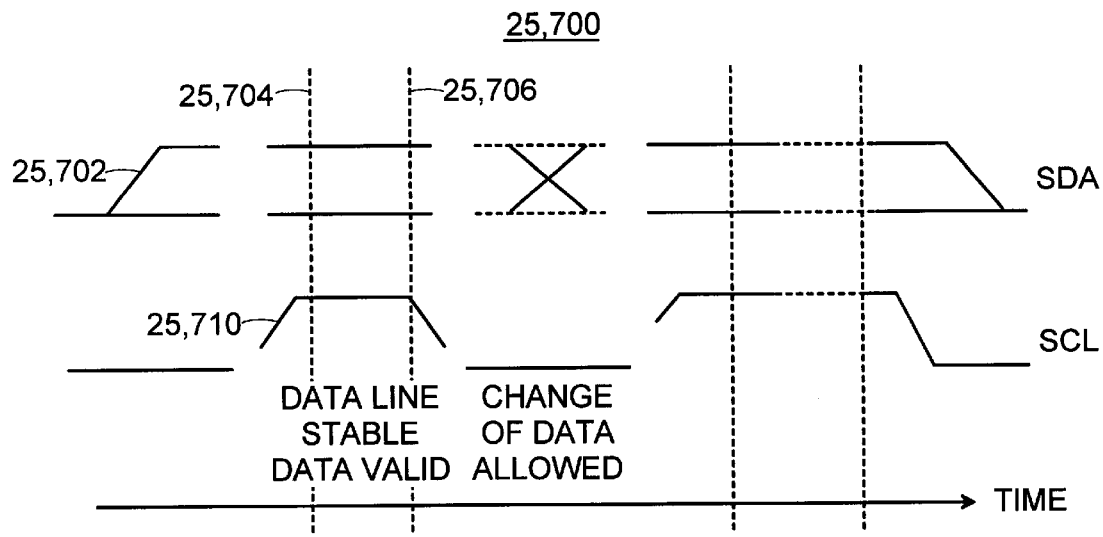
FIG. 25 is a timing diagram of data transfer on a two wire management bus.

Turning now to FIG. 25, there is shown a timing diagram for transfer of data by pulses on the serial clock line SCL line 24,602 and the serial data line 24,604. The voltage pulse 25,702 on serial data line SDA line 24,604 is maintained stable between the initial time 25,704 and final time 25,706, and during the time interval between initial time 25,704 and final time 25,706, the clock pulse 25,710 on serial clock line SCL line 24,602 rises and falls in order to provide a sampling time for the voltage on serial data line SDA line 24,604. One device is transmitting the pulses and all other devices may receive the pulses, by sampling the serial data line SDA line 24,604 under the control of the serial clock pulse on SCL line 24,602, during the time interval from time 25,704 to time 25,706.

Figure 26:
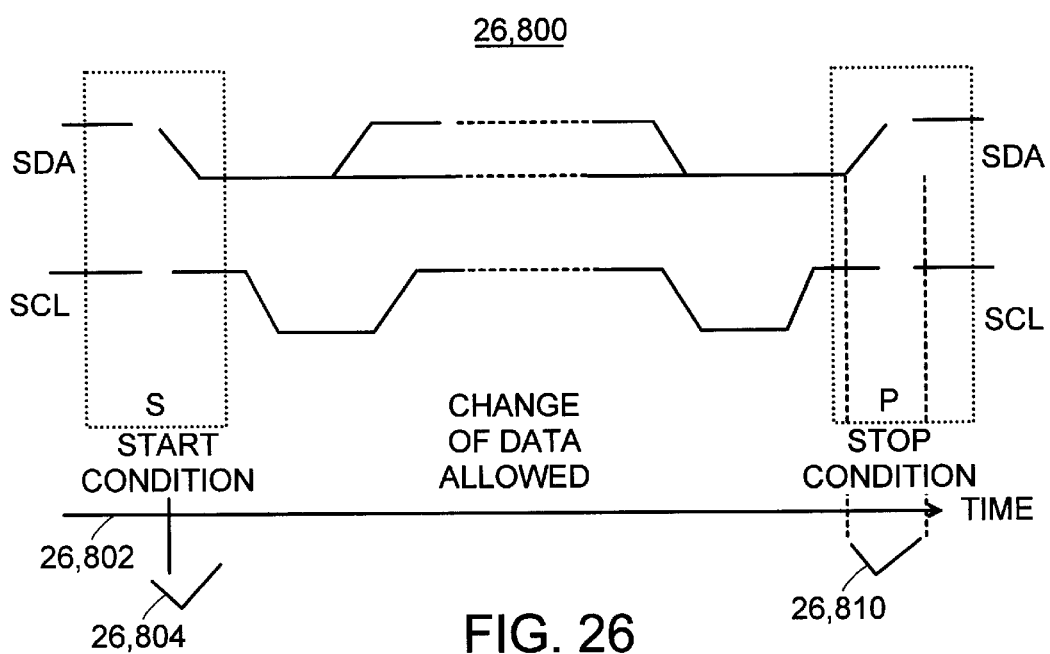
FIG. 26 is a timing diagram of a start condition and a stop condition on a two wire management bus.

Turning now to FIG. 26, there is shown a start transmission condition and a stop transmission condition. During idle time both the SCL line 24,602 line is maintained high, near power supply voltage VDD, and the SDA line 24,604 line is maintained high, as shown at time 26,802. The transmitting device transitions the SDA line 24,604 line to low while maintaining the SCL line 24,602 high in order to indicate to other devices that a transmission is starting, as shown at time interval 26,804. In order to indicate the stop condition after the conclusion of a transmission, the transmitting device drives both the SCL line 24,602 and the SDA line 24,604 line to a voltage near power supply voltage VDD, as shown in time interval 26,810.

Figure 27:
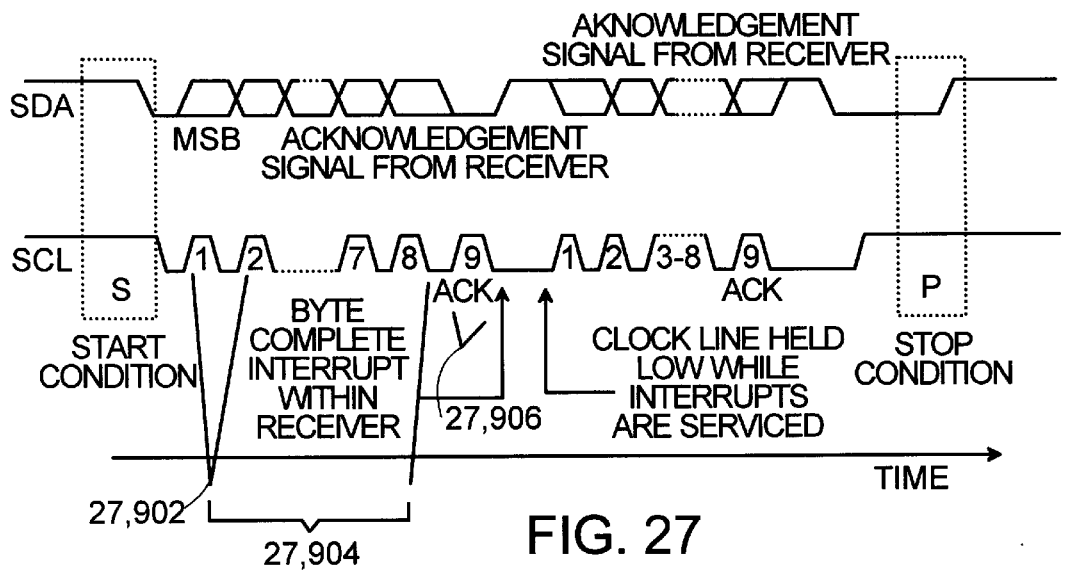
FIG. 27 is a timing diagram of data transfer on a two wire management bus.

Turning now to FIG. 27, transmission of data using the SCL line 24,602 and the SDA line 24,604 is shown. The transmitting device drives the SCL line 24,602 through its transistor 24,612 and drives the SDA line 24,604 through its transistor 24,622. The receiving device reads the SDA line 24,604 voltage during time intervals such as time interval 27,902. Eight bits 27,904 are transmitted as a byte by the transmitting device, and then the receiving device transmits an acknowledge bit 27,906. In the event that the receiving device fails to transmit the acknowledge bit, then a protocol determines the next event. For example, if the receiver does not transmit an acknowledge bit, the transmitter may execute a stop condition and then cease transmission.

Figure 28:
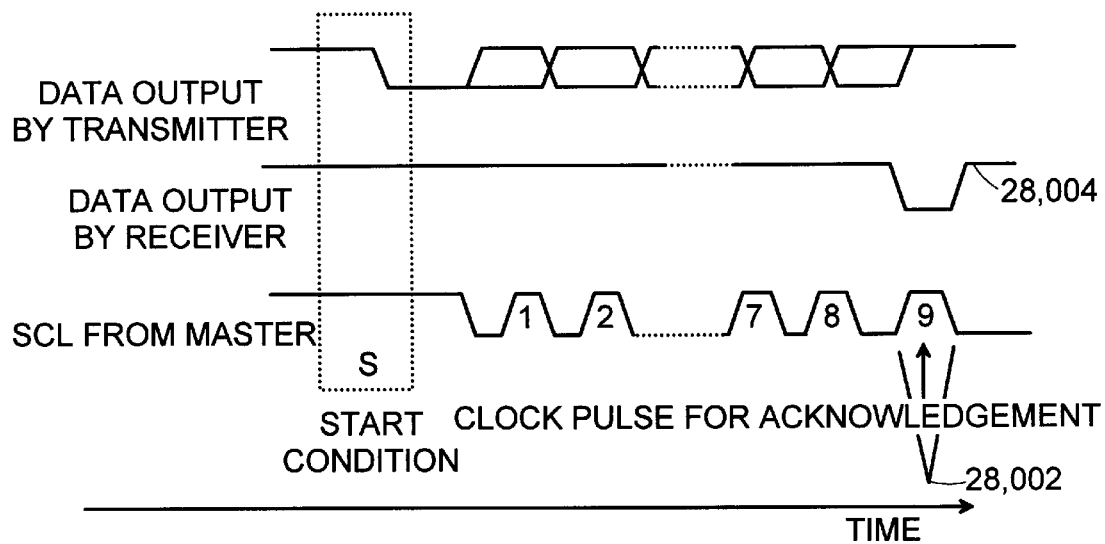
FIG. 28 is a timing diagram of an acknowledge condition on a two wire management bus.

Turning now to FIG. 28, a more detailed view of the acknowledge pulse is provided. During time interval 28,002, the receiver output line drives the SDA line 24,604 toward ground by driving its transistor 24,612 into conduction, as shown by pulse 28,004.

A transmitting device may transmit only if the SDA line 24,602 and SCL line 24,604 are both free. Two devices may both transmit the start signal during a minimum hold time. The devices must then arbitrate in order to determine which begins transmitting. Arbitration takes place by the devices monitoring the SDA line 24,604 and comparing the value which the device expects on the SDA line 24,604 with what it actually reads from the SDA line 24,604. A device transmitting a high level, and which measures a low level on the SDA line 24,604 will switch off. Arbitration may continue for many bits, until there is a bit mismatch between the data which the two devices are transmitting.

Figure 29:
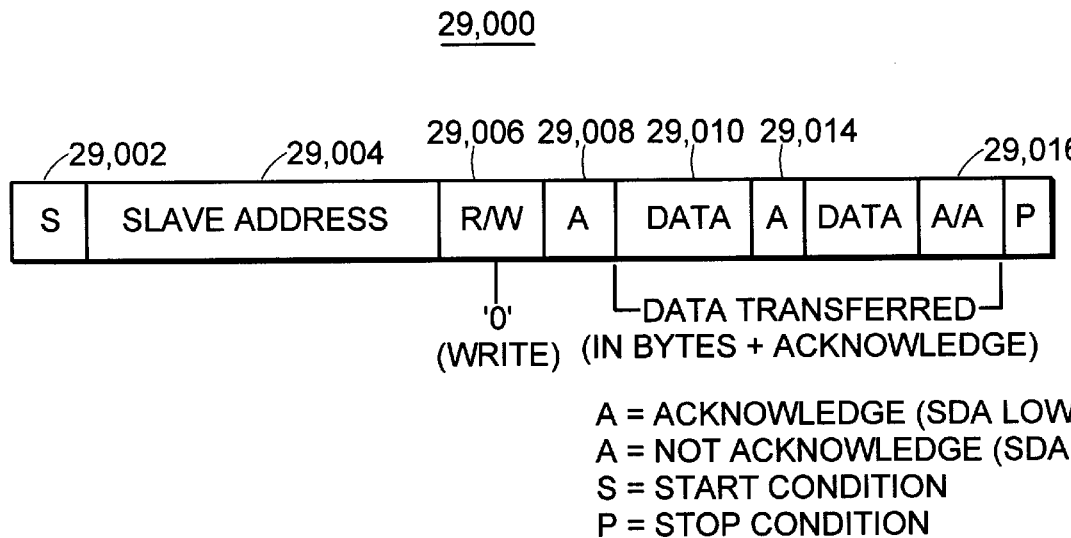
FIG. 29 is a field diagram of a data packet on a management bus written by a bus master to a slave.

Turning now to FIG. 29, there is shown a packet format 29,000 for data transmitted on the SDA line 24,604 and the SCL line 24,602. The start condition is generated by the transmitting device during bit interval 29,002. The destination address, referred to the slave address in I2C standard terminology, is transmitted as 7-bits in field 29,004. Field 29,006 is the one bit, 1-bit, r/w field, and contains a "0", indicating to the addressed device that it is a "write" message from the transmitting device, and that the addressed device is to receive the message. The two fields, the 7-bit address field 29,004 and the 1-bit r/w field 29,006 make up an 8-bit byte. Bit 29,008 is bit 9, the acknowledge bit, and is transmitted by the receiving device, as explained hereinabove. Devices using the I2C format are divided into master and slave devices. Transmissions using the I2C bus protocol on management bus 19,120 are under the control of the master device. Data is transmitted as an 8-bit byte in field 29,010. The 9'th bit for acknowledgment by the receiver is in field 29,014. Data and acknowledgment bits are then exchanged until the transmitting device has transmitted its entire message. In the event that the receiving device cannot receive more data over the management bus line 19,120, the receive generates a NOT Acknowledge signal by leaving the SDA data line 24,604 high, rather than driving it low for an acknowledgment bit as shown in FIG. 26. A NOT acknowledge bit is shown in field 29,016. In response to receiving the NOT acknowledge bit from the receiving device, the transmitting device executes a stop condition 26,810 by driving both the clock line SCL line 24,602 and the data line SDA line 24,604 high, and ends its transmission.

Figure 30:
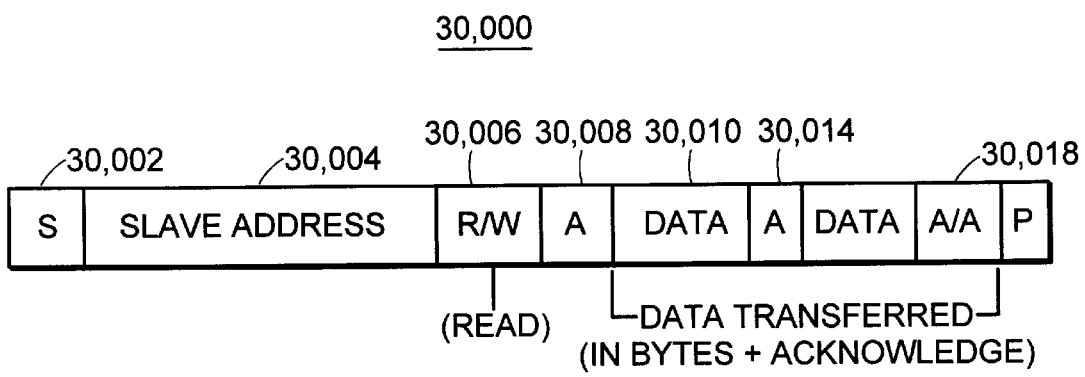
FIG. 30 is a field diagram of a data packet on a management bus read by a bus master, after being written by a slave.

Turning now to FIG. 30, a packet format for a master device to receive data from a slave device is shown. When a master device desires to receive data from a slave device ,the master device first executes a start condition in field 30,002. Then the master device transmits the slave device address as a 7-bit address in field 30,004. The r/w field, the eighth bit, in field 30,006 is set to "1" to indicate to the slave that this is a read command from the master. That is, the master device expects to "read" data from the slave device. The slave device then transmits a 8-bit data byte in field 30,010. The master then transmits an acknowledge bit as bit 9 in field 30,014. The slave continues to transmit data bytes and the master continues to transmit acknowledge bits until the master is finished receiving data, when the master transmits a stop condition. However, the master may transmit a NOT acknowledge bit by holding the SDA line 24,604 high rather than drive it low, as shown in field 30,018. The master then executes a stop condition.

Figure 31:
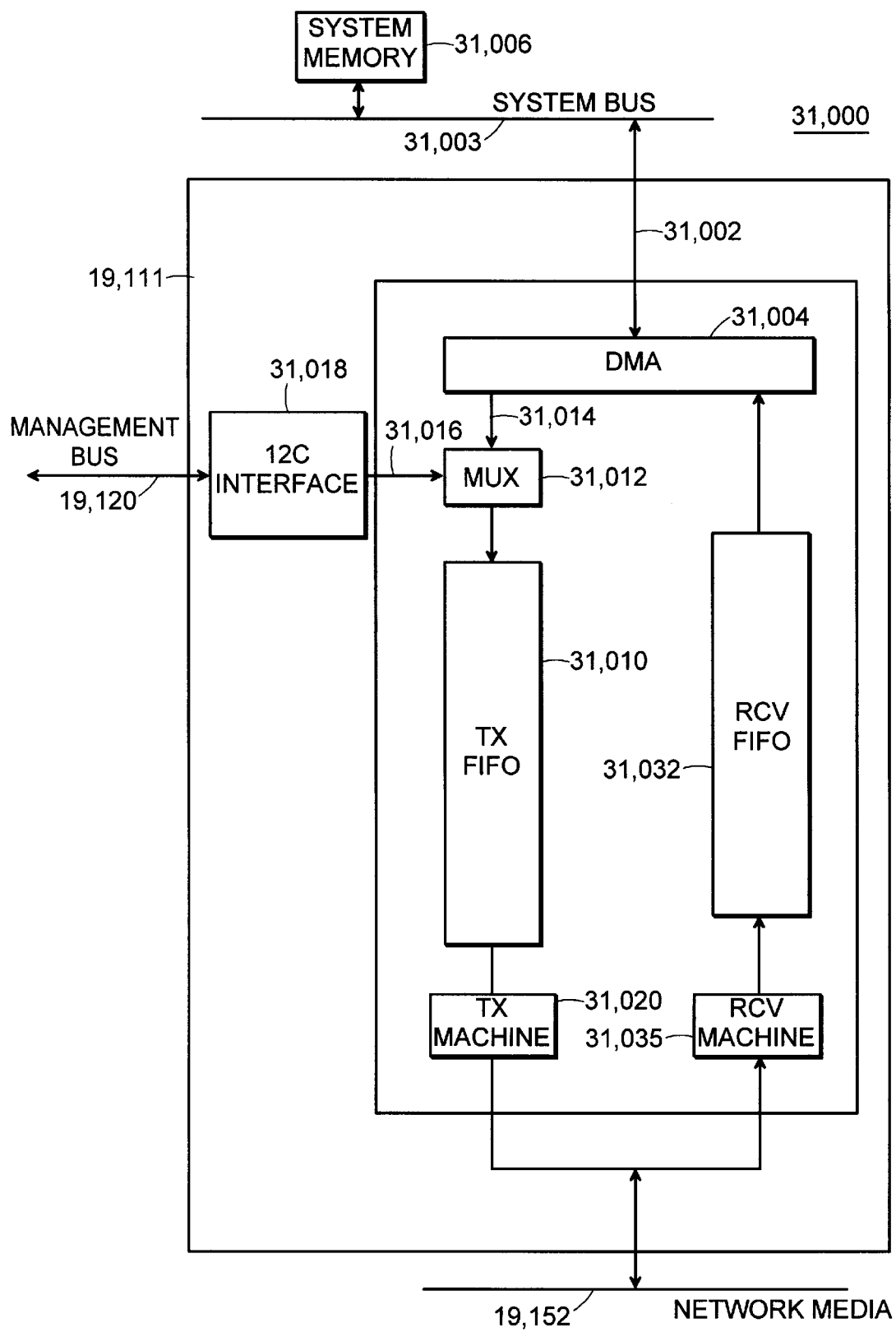
FIG. 31 is a block diagram of a network subsystem.

Turning now to FIG. 31, there is shown an exemplary block diagram 31,000 of network subsystem 19,111. Bus connection 31,002 connects to a system bus, as shown FIG. 19 by bus connection in 19,113, and as shown in FIG. 22 by bus connection 22,405. Bus connection 31,002 connects the system bus to Direct Memory Access machine, DMA machine 31,004. DMA machine 31,004 controls the data structures in system memory 31,006, and the data transfer protocol, for direct transfer of data between system memory 31,006 and network subsystem 19,111.

During transmit operation, data in system memory 31,006 is transferred over the system bus (or busses as in FIG. 19), through bus connection 31,002, and into transmit FIFO, TX FIFO 31,010, by passing through multiplexer MUX 31,012. MUX 31,012 has a first input along line 31,014 from DMA machine 31,004, and a second input along line 31,016 from I2C interface 31,018. MUX 31,012 has an output to transmit FIFO, TX FIFO 31,010. During ordinary operation of network interface 19,111, MUX 31,012 accepts data as input from DMA machine 31,004, and delivers the data to TX FIFO 31,010. Transmit machine TX machine 31,020, then reads out transmit FIFO 31,010, and transmits the data onto network media 19,152.

When I2C interface 31,018 has data which it has received from management bus 19,120, then MUX 31,012 gives priority to its input line 31,016 from I2C interface 31,018, and loads the data from the I2C interface into transmit FIFO 31,010. When the transmit FIFO 31,010 is loaded, then transmit machine 31,020 transmits the data from the I2C interface onto the network media 19,152 by reading transmit FIFO 31,010.

A speed difference between operation of the system bus 31,003 which, for example may operate at clock speeds of tens of MegaHertz, and the management bus which for example may operate at the slow clock rate of a few hundreds KiloHertz, is easily accommodated by the design shown in FIG. 31. During ordinary transmit operation, the system bus 31,003 (31,002) and the DMA machine 31,004 transfer data into transmit FIFO 31,010 at their ordinary transfer rate. Transmit machine 31,020 then empties transmit FIFO 31,010 at a transfer rate compatible with the technology of network media 19,152. In contrast, when multiplexer 31,012 accepts data from I2C interface 31,018, transmit FIFO fills at the slow clock rate of the management bus 19,120. Then after the transmit FIFO is ready for transmission, the transmit machine 31,020 again empties the transmit FIFO 31,010 at the transfer rate which is compatible with the technology of network media 19,152. That is, transmit machine 31,020 always empties transmit FIFO at network speed, independently of the clock rate used to write the data into the transmit FIFO 31,010.

Any network technology may be used for network media 19,152. In a preferred embodiment of the invention, network media 19,152 uses the standard CSMA/CD Ethernet technology of IEEE Standard 802.3. Alternatively, network media 19,152 could be a FDDI token ring, or an IBM token ring, or an ATM network using virtual circuits, or any other standard network technology.

The use of multiplexer 31,012 along with transmit FIFO 31,010 provides a backdoor transmission path from management bus 19,120 to network media 19,152. The ordinary front door for transmission of data onto network media 19,152, comprising system memory 31,006, system bus 31,003, and the machinery of direct memory access controlled by DMA machine 31,004 is totally bypassed when transmission of a message from management bus 19,120 is required. Data from management bus 19,120 is received by I2C interface 31,018, then I2C interface 31,108 gains control of multiplexer 31,012, the data from the I2C interface is loaded into transmit FIFO 31,010, and the data is transmitted onto network media 19,152 by transmit machine 31,020. Accordingly, in the event that any link in the system memory, system bus, main CPU, etc. is not working because of system failure, then so long as both network subsystem 19,111 is functional and management bus 19,120 is functional, an error message generated on management bus 19,120 can be transmitted onto network media 19,152.

During receive operation, a network data packet addressed to network subsystem 19,111 is detected by the receive machine, RCV 31,030, and is transferred from network media 19,152 into the receive FIFO, RCV FIFO 31,032. Data in receive FIFO 31,032 is then transferred by direct memory access machine 31,004 over system bus connection 31,004, and system bus 31,003 to system memory 13,006.

A management packet received from network media 19,152 may, for example, initiate a process in system CPU 19,107, and the process may initiate a data transfer on management bus 19,120, resulting in transmission of a message from I2C interface 31,018 to network media 19,152. For example, fan status through interface 19,123, temperature status through interface 19,127, power supply voltages through interface 19,135, etc., may, for example, be generated through system CPU 19,107 initiating a transaction by addressing management bus processor 19,150 through an interface such as interfaces 19,138, or 19,140, or 19,142, or 19,144, or 19,146.

Figure 32:
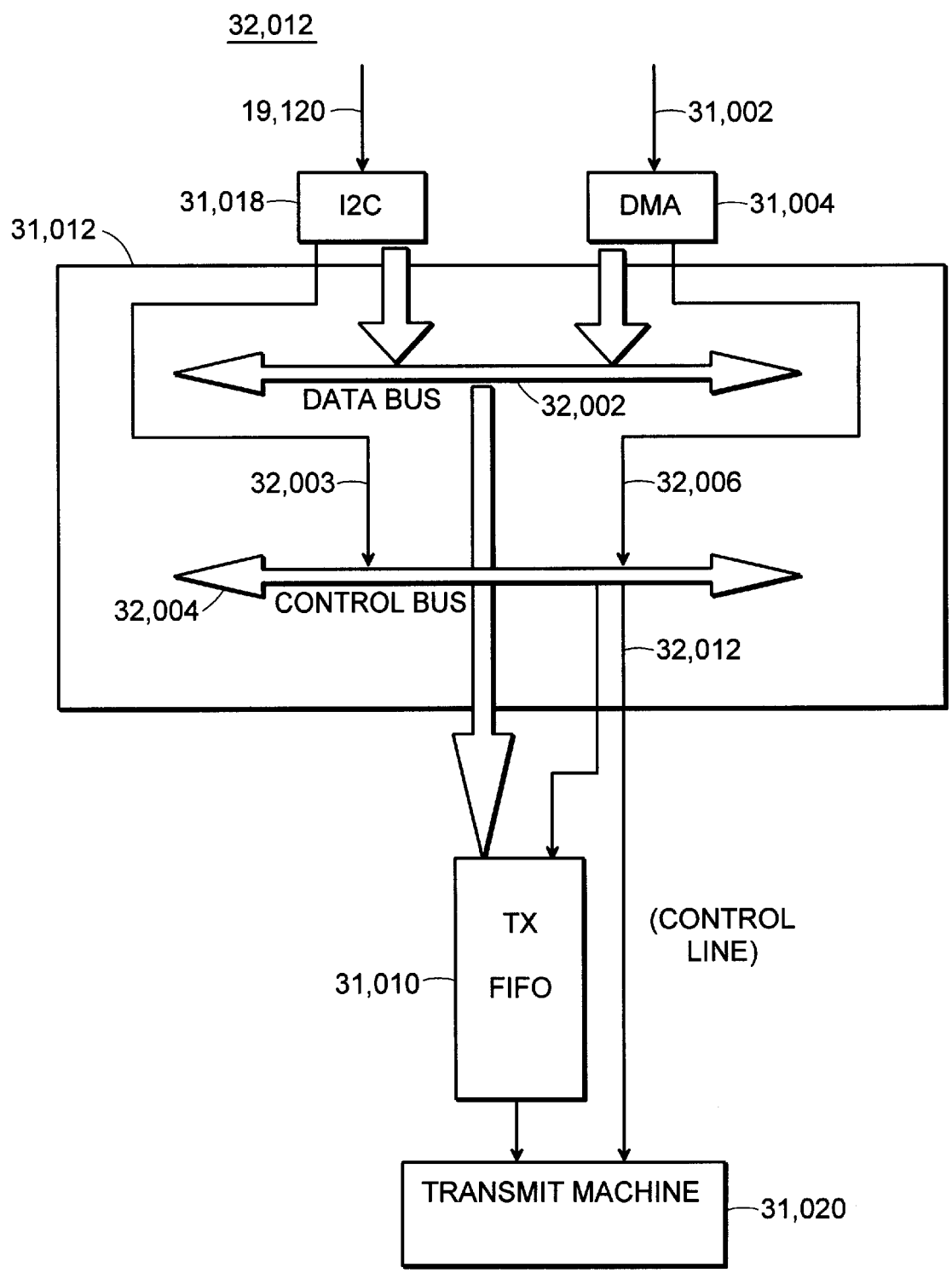
FIG. 32 is a block diagram of a multiplexer in a network subsystem.

Turning now to FIG. 32, a block diagram of an architecture of a multiplexer 31,012 is shown. I2C interface 31,018 receives data from management bus 120, and transfers the data through data bus 32,002 to transmit FIFO 31,010. I2C interface 31,018 transfers control signals along line 32,003 to control bus 32,004 in order to control transmit FIFO 31,010.

DMA machine 31,004 receives data from system bus 31,002, and transfers the data through data bus 32,002 to transmit FIFO 31,010. DMA machine 31,004 transfers control signals along line 32,006 to control bus 32,004 in order to control transmit FIFO 31,010.

Figure 33:
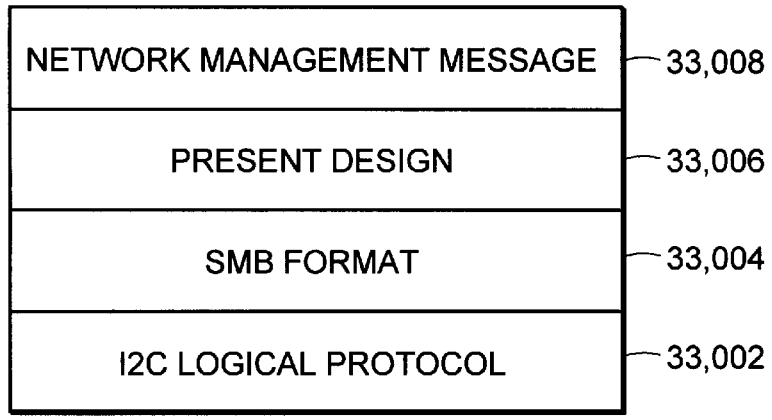
FIG. 33 is a block diagram of format levels on the management bus.

Turning now to FIG. 33, there is shown an exemplary set of protocols used in implementing protocol on management bus 19,120. In a preferred embodiment of the invention, the management bus 19,120 is implemented using the electrical and logical specifications of the I2C bus defined by Phillips Semiconductor in the documents incorporated by reference hereinabove, and as shown by block 33,002. Also, in a preferred embodiment of the invention, the data transfer protocol defined for the I2C bus by Intel Corporation referred to as the SMB bus protocol is adopted herein, as shown by block 15,004. The SMB bus protocol is described in the document *System Management Bus Specification, Revision 1.0*, Feb. 15, 1995, published by Intel Corporation, all disclosures of which are incorporated herein by reference. The SMB bus protocol defines data packets and fields for the data packets, and is generalized so that an implementor may define the data which goes in the SMB packets. In the present preferred embodiment of the invention, a generalized data format is defined, and that generalized data format is fitted into the SMB format.

The generalized data format of the present preferred embodiment of the invention is shown as block 33,006. The data format of block 33,006 is implemented in interfaces 19,123, and 19,127, and 19,131, and 19,135, and 19,138, and 19,140, and 19,142, and 19,144, and 19,146, etc., the management bus processor 19,150 and the I2C bus interface 31,018. The data format of block 33,006 is flexible in order to permit a person designing computer system 19,100 to define his/her own error messages.

A network management message is represented by data block 33,008. The network management message is designed by the person who designs the computer system 19,100. The network management message is made up of bytes. The computer system 19,100 error messages are transferred onto management bus 19,120, through the protocol of data block 33,006 where they are put into SMB format of data block 33,004. The messages in SMB format are transferred using the electrical and logical signals defined for the I2C bus.

The SMB bus protocol specifies at least eight different data transfer protocols in which a data transfer on the I2C bus may be organized. Only two of the SMB bus data transfer protocols are implemented in a preferred embodiment of the invention, the SEND BYTE protocol and the WRITE WORD protocol. The other SMB data transfer protocols are not necessary in the present preferred embodiment of the invention.

Figure 34:
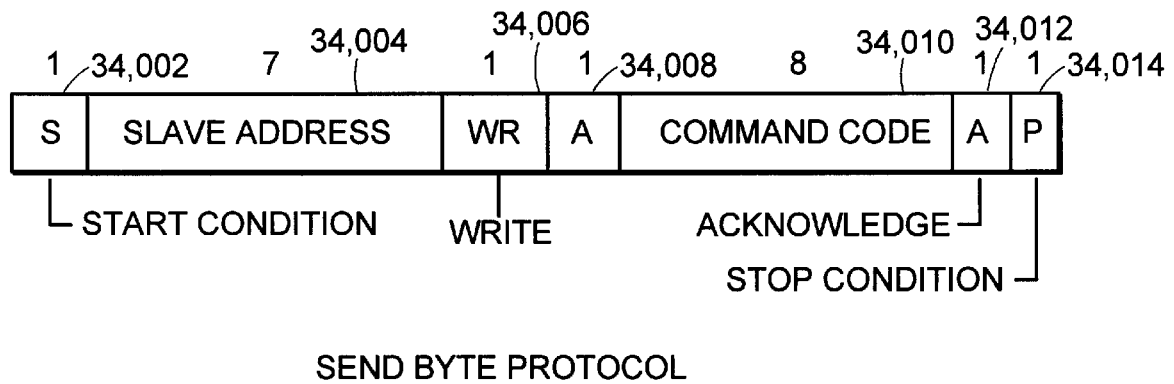
FIG. 34 is a data packet field diagram for a management bus.

Turning now to FIG. 34, the SEND BYTE protocol defined in the SMB bus protocol is shown. A device which has data to transmit becomes a bus master under the I2C protocol. The device, as a bus master, then initiates transmission of a data packet onto the management bus 19,120. The data packet has fields. The number of bits in a field are shown above the field in FIG. 34. The first field 34,002 is the START condition described in FIG. 26 through FIG. 30. The next field 34,004 is the seven bit address of the slave device to which the packet is addressed. The next field 34,006 is the read/write bit "Wr", and is set to "0" as the bus master is writing data. The next field 34,008 is the acknowledge field, and the slave device acknowledges to the bus master, as described in FIG. 26 through FIG. 30. The next field 34,010 is an eight bit command code. The next field 34,012 is an acknowledge field where the slave device acknowledges to the bus master, as in field 34,008. The final field 34,014 is a STOP condition, as defined in FIG. 26 through FIG. 30.

Figure 35:
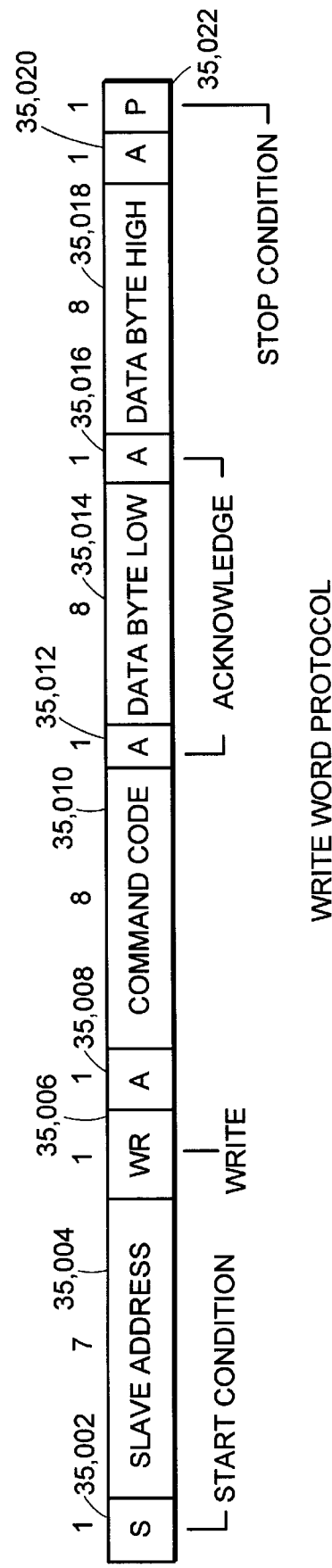
FIG. 35 is a data packet field diagram for a management bus.

Turning now to FIG. 35, the WRITE WORD protocol is shown. The first bit transmitted by the bus master is the START condition in field 35,002. The next field is the seven bit address 35,004 of the slave device to which the packet is directed. The next field is the read/write bit "Wr" 35,006, and this bit is set to "0" to indicate that data is being written by the bus master. The next field 35, 008 is the acknowledge bit transmitted by the slave device. The next field is an eight bit command code 35,010 transmitted by the bus master. The next field 35,012 is an acknowledge bit transmitted by the slave device. The next field 35,014 is an eight bit data byte transmitted by the bus master. The next field 35,016 is an acknowledge bit transmitted by the slave device. The next field 35,018 is a second eight bit data byte transmitted by the bus master. The next field 35,020 is an acknowledge bit transmitted by the slave device. The last field is a STOP condition 35,022 transmitted by the bus master.

Of the at least eight SMB data transfer protocols, only the SEND BYTE and the WRITE WORD formats are used in the present preferred embodiment of the invention for communication between the management bus processor 19,150 and the management bus interface 20,202 in network chip 22,402. Interfaces 19,123, or 19,127, or 19,131, or 19,135, or 19,138, or 19,140, or 19,142, or 19,144, or 19,146 etc., may use any protocol that meets the I2C specification to transfer messages to management processor 19,150. Management processor 19,150 then must load the data bytes, and possibly the commands, which it receives into the I2C interface. Also, management processor 19,150 commands I2C processor to initiate a transfer of data into transmit FIFO 31,010 for transmission onto network media 19,152.

The I2C interface 31,018 presence on management bus 19,120, in a preferred embodiment of the invention, is only as a slave which does not transmit to the management bus 19,120. That is, the I2C interface 31,018 accepts bytes written to it over the management bus 19,120, however it ignores any commands for it to transmit data onto the management bus 19,120.

Figure 36:
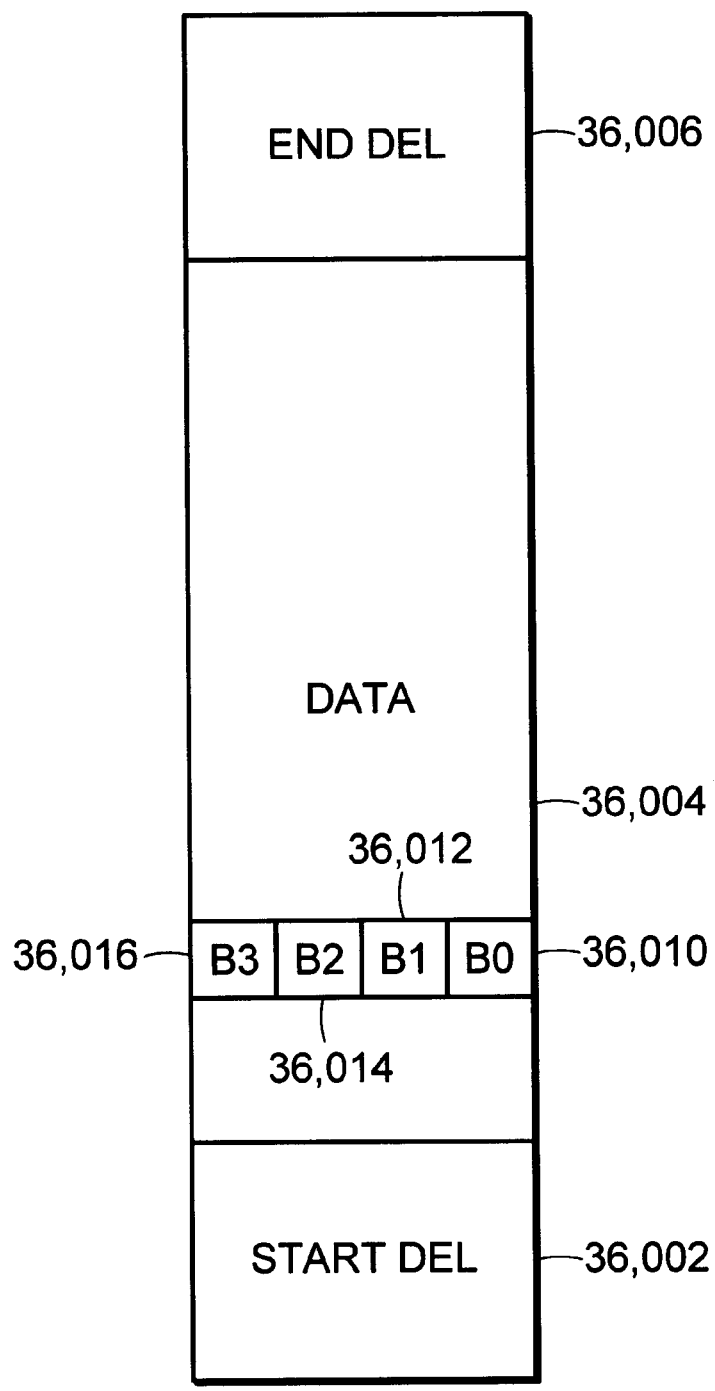
FIG. 36 is a data format diagram for data in a transmit FIFO.

Transfer of data from I2C interface 31,018 into transmit FIFO 31,010 will next be described. Turning now to FIG. 36, the format of data placed into transmit FIFO 31,010 is shown. The first field is a start delimiter 36,002. The second field is data field 36,004. And finally, the last field is end delimiter field 36,006. The start delimiter field 36,002 and the end delimiter field 36,006 are the same packet delimiters used in ordinary DMA machine data transmissions.

Transmit FIFO 31,010 has a four byte wide data path, as shown in data field 36,004 by the bytes, byte zero B0 36,010, byte one B1 36,012, byte two B2 36,014, and byte three B3 36,016. The four byte wide data path of transmit FIFO 31,010 provides a 32 wide total data path in the FIFO. The system bus 31,003 also has a 32 bit wide data path. Accordingly, DMA machine 31,004 can transfer data from system memory 31,006 along the system bus and into the transmit FIFO in a 32 bit wide data path.

Figure 37:
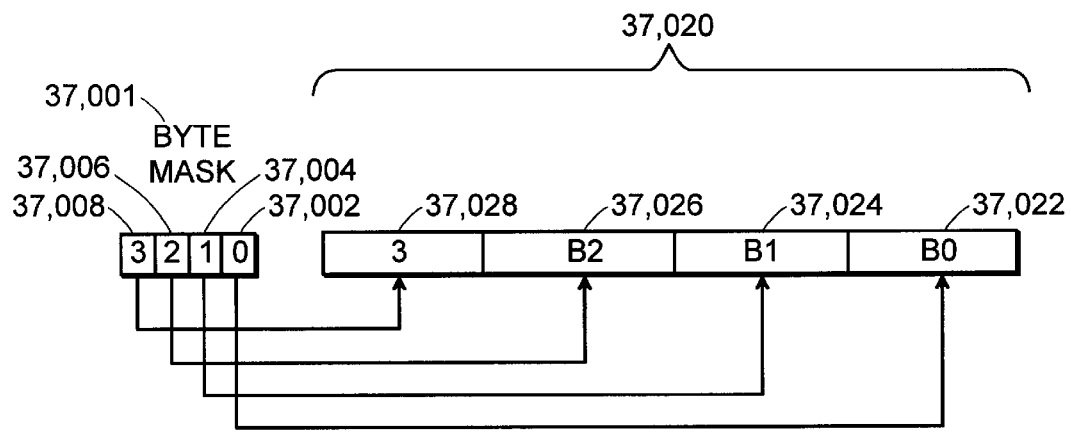
FIG. 37 is a field diagram for a byte mask and the bytes of a longword in a transmit FIFO.

Turning now to FIG. 37, the use of a byte mask to validate bytes in the transmit FIFO is shown. Bytes must be validated in the data path because a message transferred out of system memory may not have a number of bytes divisible by four, the width of the data path in bytes. Accordingly, each longword of four bytes in the data path has a four bit "byte mask". The byte mask is normally implemented in a transmit FIFO such as transmit FIFO 31,010. Byte mask 37,001 has four bits: bit "0" 37,002; bit "1" 37,004; bit "2" 37,006; and, bit "3" 37,008. Data path 37,020 is four (4) bytes wide, that is 32 bits wide. Bit "0" 37,002 points to byte B0 37,022. Bit "1" 37,004 points to byte B1 37,024. Bit "2" 37,006 points to byte B2 37,026. Bit "3" points to byte B3 37,028. When a bit in byte mask 19,001 has the value "1", then the byte pointed to is valid data. On the other hand, when a bit in byte mask 37,001 has a value of "0", then the byte pointed to is not valid.

Figure 38:
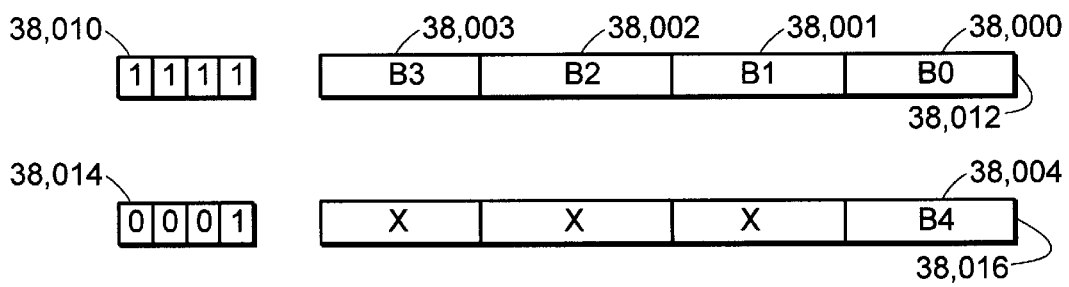
FIG. 38 is a field diagram of a byte mask and a longword in a transmit FIFO for a 5 byte message.

As an example, a five (5) byte message is shown in FIG. 38. The message, for example, as loaded into the transmit FIFO by the I2C interface has bytes B0 field 38,000, B1 field 38,001, B2 field 38,002, B3 field 38,003, and B4 field 38,004. The first longword 38,012 has the associated byte mask 38,010 having four bits each of value "1", which point to the bytes B0 38,000, B1 38,001, B2 38,002, and B3 38,003. The second longword 38,016 has the associated byte mask 38,014 having one bit of value "1" pointing to byte B4 38,004, and the other bits having a value of "0" pointing to the three bytes of longword 38,016 which do not contain valid data.

The I2C interface, on the network subsystem, receives data from all of the other interfaces on the I2C bus and stores the data into memory within the I2C chip. The I2C interface then transfers data into the management bus interface 20,202 within network chip 22,402.

There are two transfers on the I2C bus from the I2C processor (management bus processor 19,150) to the I2C interface (management bus interface 20,202) for each longword in the command because each WRITE WORD command from the SMB protocol transfers only 2 bytes from the I2C processor to the I2C interface, and each longword comprises 4 bytes.

Control signals within network chip 22,402 then cause a transfer of the data in the management bus interface 20,202 into the transmit FIFO of MAC machine 22,414.

The SMB packet protocol is given as follows.
SMB Packet Protocol

Above the I2C bus protocol, the network chip 22,402 implements a sub-set of the SMB packet protocol with unique definitions suited for the network chip 22,402 internal design. This protocol allows the network chip 22,402 and the Microcontroller (management bus processor 19,150) to transfer control and packet data in order to transmit a packet on the network wire.

After each I2C start condition, the network chip 22,402 compares the 7 bits address to its own address. If matches, the network chip 22,402 interprets the next receiving data bytes as one byte of control and the following bytes of data.

The network chip 22,402 supports the two following protocols of the SMB protocol:

Send Byte protocol

Write Word protocol

Figure 39:
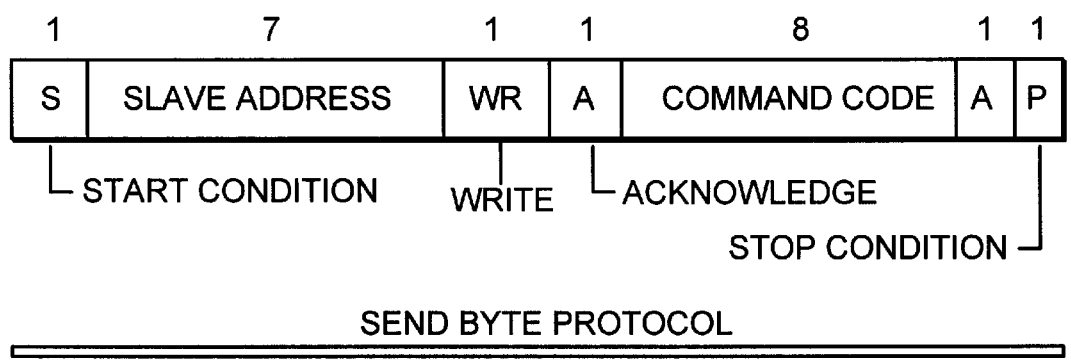
FIG. 39 is a field diagram of a send byte protocol.
Figure 41:
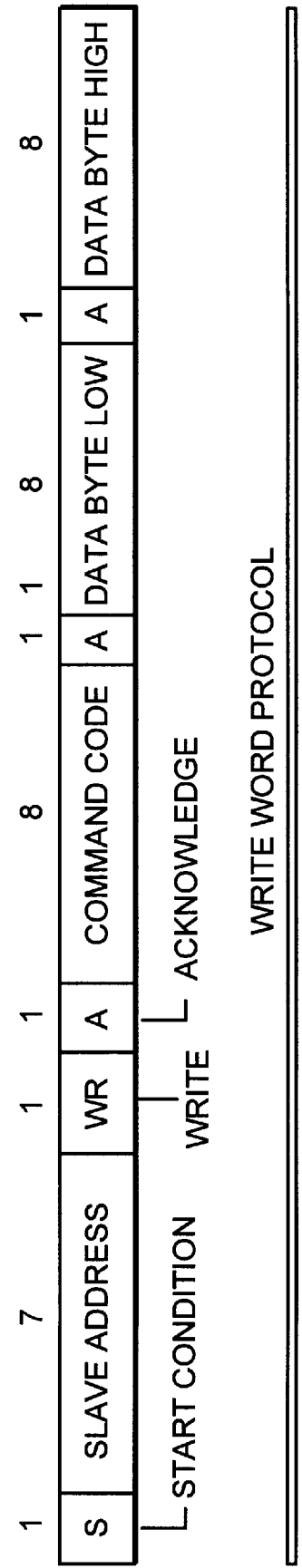
FIG. 41 is a field diagram of a write word protocol.

Send Byte Protocol:

The Send Byte protocol is shown in FIG. 39. The Send Byte protocol decodes as follows (received left to right):

Start condition, 7 bits of address, 1 bit WR, Ack, 1 byte command, Ack, Stop condition.

Write Word Protocol:

The Write Word protocol decodes as follows:

Start condition, 7 bits of address, 1 bit WR, Ack, 1 byte command, Ack, 1 byte data, Ack, 1 byte data, Ack, Stop condition.

Network Chip 22,402 Command Set

The command set of the network chip 22,402 is described below, as the START_DELIMITER, the DATA, END_DELIMITER, and the RESET commands.

1. START_DELIMITER:

The START_DELIMITER fields are shown in FIG. 40. A Start_delimiter is sent each time a new packet is transferred over the I2C bus.

Command code: 0000CP01 (binary)

C: Add CRC.

When this bit is set, the network chip 22,402 will calculate and append the CRC to the transmitted packet.

P: Disable Padding.

When this bit is set, the network chip 22,402 will not add padding to the packet. When this bit is reset to zero, the network chip 22,402 will append zero bytes to packets shorter than 64 bytes. Packets that will be padded will also have CRC calculated and appended regardless of the add CRC bit.

Protocol: Send Byte

2. DATA:

The frame data are transferred by the Data command.

Data sent to the network chip 22,402 over the I2C must be longword aligned. This means that an EVEN number of Data Command only should be issued. A byte mask allows masking the invalid bytes of the last longword if needed.

Command code: 0000MM10 (binary)

MM—are two bytes mask bits:

Bit <2>: Data Byte Low's mask

Bit <3>: Data Byte High's mask.

1: Valid byte

0: Invalid byte

Protocol: Write Word protocol is used.

The first received byte is the least significant byte and the second received byte is the most significant byte of the word. The first received byte will be transmitted first on the Ethernet wire.

3. END_DELIMITER:

The end delimiter is sent after sending all the packet data on the I2C interface to signal the end of the frame.

Command code: 00000011 (binary)

Protocol: Send Byte protocol is used.

4. RESET:

The Reset command allows the microcontroller to reinitialize the network chip 22,402.

Command code: 00000100 (binary)

Protocol: Send Byte protocol is used.

The START delimiter and the END delimiter are each from command type "Send Byte". Two versions of the command codes are used for the START delimiter, and the two options for the command codes of the START delimiter have the following meanings:

0000 1001 add CRC, add padding 0000 0101 no CRC, no padding

Figure 42:
FIG. 42 is a field diagram of an Ethernet data packet.

In a preferred embodiment of the invention, an Ethernet CSMA/CD protocol is used on the network media 19,152, and the Ethernet data packet has a CRC field, as shown in FIG. 42. The command code of the START delimiter is used to designate how the CRC field is to be calculated. When the command code of the START delimiter has the value "0000 1001", the transmit FIFO and the transmit machine add padding in PAD field so that the Ethernet data packet has the minimum necessary length, and then they compute the CRC and add it to the end of the Ethernet packet. In contrast, when the command code of the START delimiter has the value of "0000 0101", then the transmit FIFO and the transmit machine do not add padding and do not add the CRC, and these jobs are handled by the I2C interface and the management bus processor 19,150. In the option where the command code has the values "0000 0101", the CRC tests the end-to-end integrity of the transfer of data between the I2C interface of the management bus processor and the destination Ethernet controller.

The receiving station on the network calculates its CRC as the network packet is received, and if the receiver's locally calculated CRC does not agree with the CRC in the Ethernet packet, the usual diagnosis is that the network transmission corrupted the data. However, when the CRC tests transmission over the I2C bus, the problem may be corruption of data in the I2C management bus between the management bus processor and the I2C interface.

As a further alternative embodiment of the invention, both the I2C processor 19,150 and the transmit machine 31,020 may calculate the CRC in order to test the integrity of the transmission over the I2C bus.

OPERATIONAL EXAMPLES

When power is turned on in a computer in response to a wake up packet received from a network, the components of the awakened computer may not be functional. Status of the components of the computer is signaled to the network interface subsystem by means of a management bus. Also, the computer usually executes a self test as part of the "boot up" process. Timing in the "boot up" process may be controlled by a ROM, or read only memory, which is mounted on a card in the computer. For example, the self test may be performed by software executing in the system processor, and the self test software may execute before the operating system is loaded into the system processor. The self test software is read from a ROM, possibly the same ROM that controls the timing of the boot up process, or alternatively, from a different ROM. In the event that the computer fails the self test, then the normal action of the self test software is to write an error message to the monitor associated with the computer, or to write a message to a printer connected to the computer.

In the present invention, management bus processor 19,150 monitors the boot up process, for example, by sensing power activity through interface 19,134, by sensing of CPU activity through interface 19,138, by sensing boot ROM activity through interface 19,140, by sensing bus activity through interfaces 19,142, or 19,144, or 19,146, etc. Management bus processor 19,150 learns that computer system 19,100 failed a power on boot up self test by signals received from the various interfaces. Upon learning that the computer system failed a self test, management bus processor 19,150 transmits an error message to I2C bus interface 31,018, and initiates transmission of an error message on network media 19,152.

The error message transmitted onto the network media 19,152 is received by a monitoring station, and may be detected by a monitoring application program running on the monitoring station 23,504. Alternatively, a network manager person 23,502 may detect the arrival of the error message at a monitor station 23,504 as shown in FIG. 23. The error message contains addressing information so that the computer which failed the self test can be identified. In any event, a repair technician is then dispatched to perform service on the computer which failed the self test.

As a further example of using the present invention, the event of a computer crash may be transmitted to a network monitor 23,502, or 23,504. A computer crash is an event in which the computer ceases ordinary operation. A wide variety of events may cause a computer to crash. A few events which may cause a computer to crash include: a loss of electrical power to the computer; a momentary interruption of electrical power to the computer; a head crash on a disk storage unit; a process running on the computer may cause a software error and cause program execution on the computer to cease; two unrelated process may write to the same memory location, thereby producing a software collision which causes the executing process to halt when it reads that memory location; etc. A crash may be detected by one of the interfaces connected to the management bus 19,120.

A power failure, or momentary power failure, may be detected by power supply interface 19,135; a loss of CPU activity may be detected by CPU interface 19,138; loss of bus activity may be detected by any of the bus monitoring interfaces 19,142, or 19,144, or 19,146, etc. When any interface detects a failure condition, the interface transmits an error message to management bus processor 19,150. Management bus processor 19,150 then transfers an error message to I2C interface 31,018, and I2C interface then initiates transmission of an error message onto network media 19,152. The computer system which failed is identified by the addressing information placed in the network message.

The network monitor station 23,504, and the person 23,502 monitoring the network, are then informed that the computer system failed, and a service technician is dispatched to fix the computer.

In a first exemplary embodiment of the invention, the network subsystem operates from battery 22,432, and also management bus processor 19,150, or 22,430 operates from battery 22,432, as do the management bus interfaces 19,123, or 19,127, or 19,131, or 19,135, or 19,138, or 19,140, or 19,142, or 19,144, or 19,146. Accordingly, the error messages can be transmitted onto network media 19,152 even when the system power supply becomes non-functional.

In a second exemplary embodiment of the invention, the system power supply is used to power some components of the management bus, and may also be used to power the network subsystem. The system power supply must then be operational in order for an error message to be transmitted onto network media 19,152. Powering management bus components from the system power supply gives a cheaper design than including battery 22,432 in the computer system, however this design provides less ability to inform a network monitor that the computer system is not functional.

It is to be understood that the above described embodiments are simply illustrative of the principles of the invention. Various other modifications and changes may be made by those skilled in the art which will embody the principles of the invention and fall within the spirit and scope thereof.

What is claimed is:

1. An apparatus suitable for use in a computer connected to a network, the computer having a power management subsystem, said apparatus comprising:

a network interface subsystem connected to a power source, said network interface subsystem comprising:
      a receiver connected to the network, for receiving data packets directed to the computer from the network, said receiver comprising filtering means to pass a selected one of said data packets to said network interface subsystem, said filtering means comprising, mask means and offset means for filtering a portion of said received data packet;
      means for computing the hash value of said filtered portion of said received data packet;
      means for comparing said computed hash value with at least one predetermined hash value;
      means for passing said received data packet to said network interface subsystem if said computed hash value matches said at least one predetermined hash value;
      means for commanding the power management subsystem to power at least one computer component when said filtering means passes a received data packet; and
      a transmitter connected to the network, for sending a status packet to the network; and
   a signaling device in electrical communication with the computer and with said network interface subsystem, for providing said status packet to said transmitter if the power management subsystem has powered said at least one computer component.

2. The apparatus as in claim 1 further comprising:
   a processor which executes a self test upon application of power to said processor; and
   a self test signaling device to signal to said network interface subsystem the results of said self test.

3. The apparatus as in claim 1 wherein said signaling device comprises a management bus.

4. The apparatus as in claim 1 wherein said signaling device comprises a bus operating with the I2C protocol.

5. The apparatus as in claim 1 wherein said filtering means comprises imperfect filtering means.

6. The apparatus as in claim 3 wherein said transmitter comprises a management bus interface, said management bus interface for receiving data from said management bus, for transferring said data to a media access controller (MAC) machine, and for passing data from a logical link control (LLC) layer to said MAC machine.

7. A method of operating a computer having a power management subsystem and connected to a network, said method comprising the steps of:

maintaining power to a network interface subsystem in the computer;

receiving a data packet directed to the computer by the network;

filtering said received data packet by means of a filter mask used in conjunction with an offset value to obtain a filtered portion of said received data packet;

computing the hash value of said filtered data packet portion;

comparing said computed hash value with a predetermined hash value;

commanding the power management subsystem to restore power to at least one computer component if said computed hash value matches said predetermined hash value;

signaling the status of said at least one computer component to said network interface subsystem upon restoration of power to said at least one computer component; and, transmitting by said network interface subsystem, in response to said step of signaling the status, a status packet onto the network giving a status of said at least one computer component in the event that said at least one component is not functional.

8. The method as in claim 7 wherein said step of signaling comprises the step of using a management bus for said signaling.

9. The method as in claim 7 wherein said step of signaling comprises the step of using a bus employing the I2C protocol for said signaling.

10. The method as in claim 7 further comprising the steps of: transferring data by a management bus interface from a management bus to a media access controller (MAC) machine and passing data from a logical link control (LLC) layer to said MAC machine.

11. A computer suitable for use in a network, said computer comprising:

a network interface subsystem having power applied thereto even when power is removed from at least one other component of said computer, said network interface subsystem comprising
      a receiver to receive a data packet directed to said computer from the network, and in response to receipt of a selected said data packet, to restore power to said at least one other component;
      a transmitter;

at least one system bus;

a signaling device in electrical communication with said network interface subsystem via a management bus, and with said at least one other component, for reporting the status of said at least one other component to said network interface subsystem upon restoration of power to said at least one other component; and, multiplexing means in electrical communication with said at least one system bus and with said management bus, said multiplexing means functioning to pass data packets from said signaling device to said transmitter and from said computer to said transmitter;

said transmitter in said network interface subsystem operating to send onto the network, in response to said signaling device, a status packet giving a status of said computer in the event that said at least one component is not functional, following restoration of power to said at least one component.

* * * * *